US012592726B2

(12) United States Patent
Ono et al.

(10) Patent No.: US 12,592,726 B2
(45) Date of Patent: Mar. 31, 2026

(54) RADIO FREQUENCY MODULE AND COMMUNICATION DEVICE

(71) Applicant: Murata Manufacturing Co., Ltd., Nagaokakyo (JP)

(72) Inventors: Atsushi Ono, Nagaokakyo (JP); Hirotsugu Mori, Nagaokakyo (JP); Yoshiki Yagura, Nagaokakyo (JP); Kiwamu Sakano, Nagaokakyo (JP); Akira Noguchi, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 357 days.

(21) Appl. No.: 18/530,266

(22) Filed: Dec. 6, 2023

(65) Prior Publication Data

US 2024/0106465 A1     Mar. 28, 2024

Related U.S. Application Data

(63) Continuation of application No. PCT/JP2022/022693, filed on Jun. 3, 2022.

(30) Foreign Application Priority Data

Jun. 11, 2021     (JP) ................................. 2021-097929

(51) Int. Cl.
    *H04B 1/00*         (2006.01)
    *H04B 1/50*         (2006.01)
(52) U.S. Cl.
    CPC .............. *H04B 1/006* (2013.01); *H04B 1/50* (2013.01)
(58) Field of Classification Search
    CPC ........ H04B 1/006; H04B 1/50; H04B 1/0057; H04B 1/00; H04B 1/38; H04B 1/0067;
    (Continued)

(56) References Cited

U.S. PATENT DOCUMENTS 6,374,119 B1 *   4/2002   Jun ...................... H04B 7/2606
                                                             455/523
10,374,697 B2 *  8/2019   Schmid ................... H04B 1/50
                      (Continued)

FOREIGN PATENT DOCUMENTS

JP      2002-534898 A      10/2002
JP      2010-226467 A      10/2010
JP      2016-501467 A       1/2016

OTHER PUBLICATIONS

International Search Report and Written Opinion mailed on Sep. 6, 2022, received for PCT Application PCT/JP2022/022693, filed on Jun. 3, 2022, 08 pages including English Translation.

*Primary Examiner* — Andrew Wendell

(74) *Attorney, Agent, or Firm* — XSENSUS LLP

(57)                    ABSTRACT

A first receiving band and a first transmission band in band A and a second transmission band and a second receiving band in band B are listed in frequency order. A radio frequency module includes: first and second boards; a first filter having a passband that is the first transmission band; second and sixth filters each having a passband that is the first receiving band; third and fifth filters each having a passband that is the second receiving band; a first power amplifier connected to the first filter; a fourth filter having a passband that is the second transmission band; and a second power amplifier connected to the fourth filter. The first to third filters and the first power amplifier are disposed on the first board, and the fourth to sixth filters and the second power amplifier are disposed on the second board.

20 Claims, 10 Drawing Sheets

(58) Field of Classification Search
CPC ... H04B 1/04; H04B 1/16; H04B 1/40; H04B
1/005; H04B 7/02; H04B 7/0413
See application file for complete search history.

(56)                    References Cited

U.S. PATENT DOCUMENTS

| 11,005,519 | B1 * | 5/2021 | Turkowski | H04B 7/0408 |
|---|---|---|---|---|
| 11,201,631 | B1 * | 12/2021 | Lee | H04M 1/0266 |
| 2013/0049882 | A1 * | 2/2013 | Yamashita | H03H 9/725 |
| | | | | 333/133 |
| 2014/0342678 | A1 * | 11/2014 | Khlat | H04B 1/44 |
| | | | | 455/78 |
| 2015/0304596 | A1 * | 10/2015 | Petrovic | H04N 5/50 |
| | | | | 348/731 |
| 2016/0127015 | A1 | 5/2016 | Wloczysiak et al. | |
| 2018/0351727 | A1 * | 12/2018 | Hoffmann | H04B 7/022 |
| 2019/0089452 | A1 * | 3/2019 | Ashworth | H04B 7/208 |
| 2019/0182779 | A1 * | 6/2019 | Niu | H04L 5/143 |
| 2020/0358464 | A1 * | 11/2020 | Abbott | H03H 9/6406 |
| 2021/0359411 | A1 * | 11/2021 | Hwang | H01Q 21/28 |
| 2022/0045741 | A1 * | 2/2022 | Ashworth | H04B 1/0057 |
| 2024/0097315 | A1 * | 3/2024 | Kim | H01Q 1/243 |

* cited by examiner

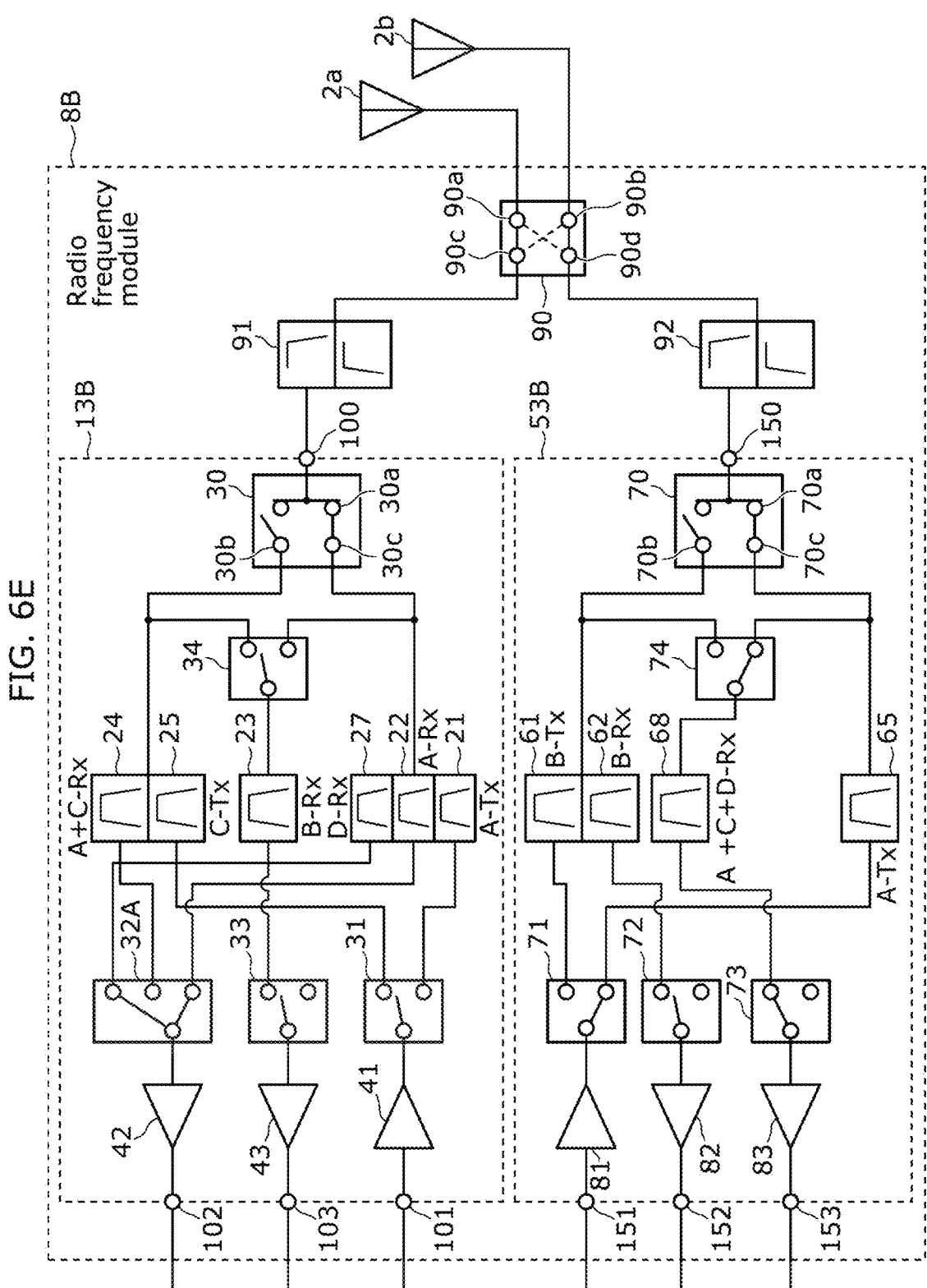

RADIO FREQUENCY MODULE AND COMMUNICATION DEVICE

CROSS-REFERENCE TO RELATED APPLICATIONS

This is a continuation application of PCT International Application No. PCT/JP2022/022693, filed on Jun. 3, 2022, designating the United States of America, which is based on and claims priority to Japanese Patent Application No. 2021-097929, filed on Jun. 11, 2021. The entire disclosures of the above-identified applications, including the specifications, drawings and claims are incorporated herein by reference in their entirety.

TECHNICAL FIELD

The present disclosure relates to a radio frequency module and a communication device.

BACKGROUND

There has been a demand for a front-end circuit that supports multiband and multi-mode communication to transmit and receive radio frequency signals with low loss and high isolation.

U.S. Patent Application Publication No. 2016/0127015 discloses a receiver module (a transmission circuit) having a configuration in which a plurality of filters having different passbands are connected to antennas with multiplexers (switches) being provided therebetween.

SUMMARY

Technical Problems

The 3rd Generation Partnership Project (3GPP (registered trademark)) requires, for instance, simultaneous transfer of radio frequency signals in a first band for Fifth Generation (5G) New Radio (NR) and radio frequency signals in a second band for Fourth Generation (4G) Long term Evolution (LTE).

Here, as recognized by the present inventor, when radio frequency signals in the first and second bands with a small frequency gap are simultaneously transferred, it is assumed that frequencies of third-order intermodulation distortion generated due to simultaneous transmission overlap the receiving band of the first band and/or the second band, and receiving sensitivity for the first band and/or the second band deteriorates.

In view of this, the present disclosure is to provide a radio frequency module and a communication device that allow multi-band simultaneous transfer and reduce deterioration in receiving sensitivity.

Solutions

In order to provide such a radio frequency module as stated above, a radio frequency module according to an aspect of the present disclosure is a radio frequency module configured to simultaneously transmit a signal in a first band and a signal in a second band. The first band includes a first uplink operating band and a first downlink operating band, the second band includes a second uplink operating band and a second downlink operating band, and the first downlink operating band, the first uplink operating band, the second uplink operating band, and the second downlink operating band are listed in ascending or descending order of frequency. The radio frequency module includes: a first board; a second board different from the first board; a first filter disposed on the first board and having a passband that includes the first uplink operating band; a second filter disposed on the first board and having a passband that includes the first downlink operating band; a third filter disposed on the first board and having a passband that includes the second downlink operating band; a first power amplifier disposed on the first board and connected to the first filter; a fourth filter disposed on the second board and having a passband that includes the second uplink operating band; a fifth filter disposed on the second board and having a passband that includes the second downlink operating band; a sixth filter disposed on the second board and having a passband that includes the first downlink operating band; and a second power amplifier disposed on the second board and connected to the fourth filter.

Advantageous Effects

According to the present disclosure, a radio frequency module and a communication device that allow multi-band simultaneous transfer and reduce deterioration in receiving sensitivity can be provided.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 5 illustrates a circuit configuration of a radio frequency module according to Variation 3 of the embodiment.

FIG. 6E illustrates a circuit configuration of a radio frequency module according to Variation 5 of the embodiment.

DESCRIPTION OF EMBODIMENTS

Figure 1:
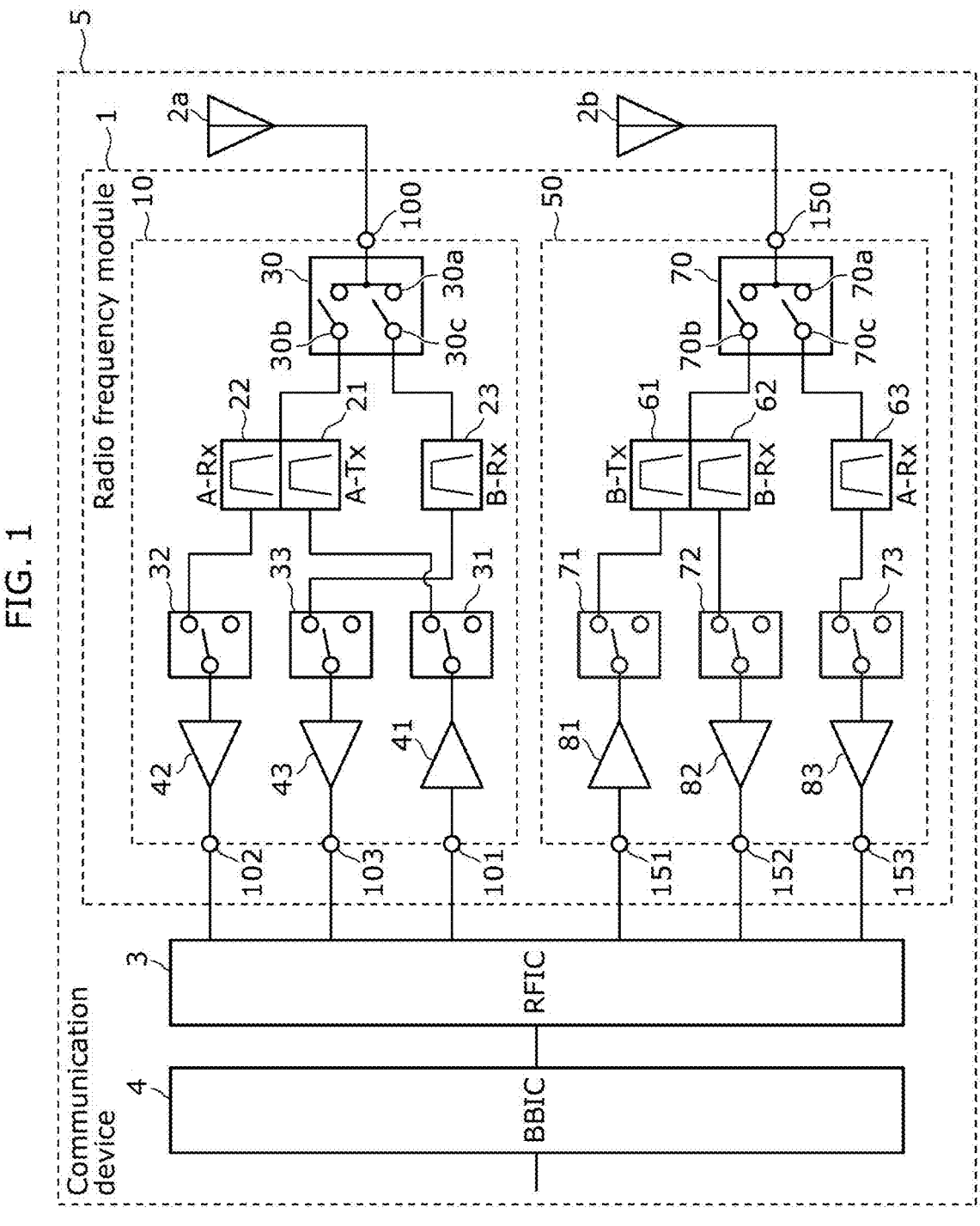
FIG. 1 illustrates a circuit configuration of a radio frequency module and a communication device according to an exemplary embodiment.

The following describes in detail exemplary embodiments of the present disclosure with reference to the drawings. Note that the embodiments described below each show a general or specific example. The numerical values, shapes, materials, elements, and the arrangement and connection of the elements, for instance, described in the following embodiments are examples, and thus are not intended to limit the present disclosure.

Note that the drawings are schematic diagrams to which emphasis, omission and ratio adjustment are appropriately added in order to illustrate the present disclosure, and thus are not necessarily accurate illustrations. The drawings may show shapes, positional relations, and ratios that are different from the actual ones. In the drawings, the same reference designator is given to substantially the same element, and redundant description may be omitted or simplified.

In the present disclosure, "being connected" includes not only when being directly connected by a connection terminal and/or a line conductor, but also when being electrically connected via another circuit element. "Being connected between A and B" means being connected to both of A and B, on a path that connects A and B.

In the arrangement of components of the present disclosure, the expression such as "a component is disposed on a board" includes a state in which the component is disposed on a principal surface of the board and a state in which the component is disposed in the board. The expression such as "a component is disposed on a principal surface of a board" includes a state in which the component is disposed above the principal surface without touching the principal surface (for example, the component is stacked on another component disposed in contact with the principal surface), in addition to a state in which the component is disposed on the principal surface in contact therewith. The expression such as "a component is disposed on a principal surface of a board" may include a state in which the component is disposed in a recess provided in the principal surface. The expression such as "a component is disposed in a board" includes a state in which the entirety of the component is disposed between two principal surfaces but a portion of the component is not covered with the board and includes a state in which only a portion of the component is disposed in the board, in addition to a state in which the component is capsulated in a module board.

In the present disclosure, a "transmission path" means a transfer route that includes, for instance, a line through which radio frequency transmission signals propagate, an electrode directly connected to the line, and a terminal directly connected to the line or the electrode. Further, a "reception path" means a transfer route that includes, for instance, a line through which radio frequency reception signals propagate, an electrode directly connected to the line, and a terminal directly connected to the line or the electrode.

EXEMPLARY EMBODIMENT

1 Circuit Configuration of Radio Frequency Module 1 and Communication Device 5

A circuit configuration of radio frequency module 1 and communication device 5 according to an exemplary embodiment is to be described with reference to FIG. 1. FIG. 1 illustrates a circuit configuration of radio frequency module 1 and communication device according to the embodiment.

1.1 Circuit Configuration of Communication Device 5

First, a circuit configuration of communication device 5 is to be described. As illustrated in FIG. 1, communication device 5 according to the exemplary embodiment includes radio frequency module 1, antennas 2a and 2b, radio frequency (RF) signal processing circuit (RF integrated circuit (RFIC)) 3, and baseband (BB) signal processing circuit (BB integrated circuit (BBIC)) 4.

Radio frequency module 1 transfers radio frequency signals between RFIC 3 and antennas 2a and 2b. A detailed circuit configuration of radio frequency module 1 is to be described later.

Antenna 2a is connected to antenna connection terminal 100 of radio frequency module 1, transmits radio frequency signals output from radio frequency module 1, receives external radio frequency signals, and outputs the external radio frequency signals to radio frequency module 1. Antenna 2b is connected to antenna connection terminal 150 of radio frequency module 1, transmits radio frequency signals output from radio frequency module 1, receives external radio frequency signals, and outputs the external radio frequency signals to radio frequency module 1.

Antenna 2a is, for example, a primary antenna, is used in preference to antenna 2b in view of antenna performance, and is an antenna element that can transmit and receive signals in band A (a first band) and band B (a second band). Antenna 2b is, for example, a secondary antenna, and is an antenna element that can transmit and receive signals in band A and band B.

RFIC 3 is an example of a signal processing circuit that processes radio frequency signals. Specifically, RFIC 3 processes a reception signal input through a reception path of radio frequency module 1 by down-conversion, for instance, and outputs a reception signal generated by being processed to baseband signal processing circuit (BBIC) 4. Further, RFIC 3 processes a transmission signal input from BBIC 4 by up-conversion, for instance, and outputs a transmission signal generated by being processed to a transmission path of radio frequency module 1. RFIC 3 includes a controller that controls switches and amplifiers, for instance, included in radio frequency module 1. Note that at least one or all of the functions of RFIC 3 as a controller may be provided outside RFIC 3, and may be provided in BBIC 4 or radio frequency module 1, for example.

BBIC 4 is a baseband signal processing circuit that processes signals using an intermediate frequency band lower than the frequency range of radio frequency signals transferred in radio frequency module 1. A signal processed by BBIC 4 is used, for example, as an image signal for image display or as an audio signal for talk through a loudspeaker.

Note that antennas 2a and 2b and BBIC 4 are not necessarily included in communication device 5 according to the exemplary embodiment.

1.2 Circuit Configuration of Radio Frequency Module 1

Next, a circuit configuration of radio frequency module 1 is to be described. As illustrated in FIG. 1, radio frequency module 1 includes module boards 10 and 50, filters 21, 22, 23, 61, 62, and 63, power amplifiers 41 and 81, low-noise amplifiers 42, 43, 82, and 83, switches 30, 31, 32, 33, 70, 71, 72, and 73, antenna connection terminals 100 and 150, radio frequency input terminals 101 and 151, and radio frequency output terminals 102, 103, 152, and 153.

Antenna connection terminal 100 is connected to antenna 2a, and antenna connection terminal 150 is connected to antenna 2b. Radio frequency input terminals 101 and 151 are for receiving radio frequency transmission signals from the outside of radio frequency module 1. Radio frequency output terminals 102, 103, 152, and 153 are for providing the outside of radio frequency module 1 with radio frequency reception signals.

Module boards 10 and 50 are boards on which circuit components included in radio frequency module 1 are mounted. As module boards 10 and 50, boards having a stacked structure of a plurality of dielectric layers are used, such as a low temperature co-fired ceramics (LTCC) board, a high temperature co-fired ceramics (HTCC) board, a component-embedded board, a board that includes a redistribution layer (RDL), and a printed circuit board, for example. Module boards 10 and 50 may be of different types of such boards. Note that module boards 10 and 50 are not included in a single continuous board, and are separate boards.

Filter 21 is an example of a first filter, and has a passband that includes a first uplink operating band included in band A (the first band) for frequency division duplex (FDD). Filter 21 is connected to antenna connection terminal 100 via switch 30.

Filter 22 is an example of a second filter, and has a passband that includes a first downlink operating band included in band A. Filter 22 is connected to antenna connection terminal 100 via switch 30.

Filters 21 and 22 are included in a duplexer for band A, which includes a first common terminal.

Filter 23 is an example of a third filter, and has a passband that includes a second downlink operating band included in band B (the second band) for FDD. Filter 23 is connected to antenna connection terminal 100 via switch 30.

Filter 61 is an example of a fourth filter, and has a passband that includes a second uplink operating band included in band B. Filter 61 is connected to antenna connection terminal 150 via switch 70.

Filter 62 is an example of a fifth filter, and has a passband that includes the second downlink operating band included in band B. Filter 62 is connected to antenna connection terminal 150 via switch 70.

Filters 61 and 62 are included in a duplexer for band B, which includes a second common terminal.

Filter 63 is an example of a sixth filter, and has a passband that includes the first downlink operating band included in band A. Filter 63 is connected to antenna connection terminal 150 via switch 70.

Power amplifier 41 is an example of a first power amplifier, and can amplify radio frequency transmission signals (hereinafter, referred to as transmission signals) in band A input through radio frequency input terminal 101. Power amplifier 41 is connected to filter 21 via switch 31.

Low-noise amplifier 42 amplifies radio frequency reception signals (hereinafter, referred to as reception signals) in band A input through antenna connection terminal 100. Low-noise amplifier 42 is connected between radio frequency output terminal 102 and switch 32.

Low-noise amplifier 43 amplifies reception signals in band B input through antenna connection terminal 100. Low-noise amplifier 43 is connected between radio frequency output terminal 103 and switch 33.

Power amplifier 81 is an example of a second power amplifier, and can amplify transmission signals in band B input through radio frequency input terminal 151. Power amplifier 81 is connected to filter 61 via switch 71.

Low-noise amplifier 82 amplifies reception signals in band B input through antenna connection terminal 150. Low-noise amplifier 82 is connected between radio frequency output terminal 152 and switch 72.

Low-noise amplifier 83 amplifies reception signals in band A input through antenna connection terminal 150. Low-noise amplifier 83 is connected between radio frequency output terminal 153 and switch 73.

Filters 21, 22, and 23, power amplifier 41, low-noise amplifiers 42 and 43, and antenna connection terminal 100 are provided on module board 10. Filters 61, 62, and 63, power amplifier 81, low-noise amplifiers 82 and 83, and antenna connection terminal 150 are provided on module board 50 different from module board 10.

Note that filters 21 to 23 may each be a surface mounted component disposed on a principal surface of module board 10 or an inductor-capacitor (LC) filter that includes a capacitor and an inductor provided on a surface of or inside of module board 10. Further, filters 61 to 63 may each be a surface mounted component disposed on a principal surface of module board 50 or an LC filter that includes a capacitor and an inductor provided on a surface of or inside of module board 50. Power amplifier 41 may be included in a semiconductor IC disposed on the principal surface of module board 10, and power amplifier 81 may be included in a semiconductor IC disposed on the principal surface of module board 50. The semiconductor ICs may each include, for example, a complementary metal oxide semiconductor (CMOS) and specifically, may be manufactured by a silicon-on-insulator (SOI) process. The semiconductor ICs may each include at least one of GaAs, SiGe, or GaN. Note that the semiconductor material of the semiconductor ICs is not limited to the material stated above.

Note that band A (the first band) and band B (the second band) each mean frequency bands predefined by, for instance, a standardizing body (such as, for example, the 3rd Generation Partnership Project (3GPP (registered trademark)) or the Institute of Electrical and Electronics Engineers (IEEE)) for a communication system constructed using wireless access technology (RAT: radio access technology). In the exemplary embodiment, as the communication system, for example, a Fourth Generation (4G)-Long Term Evolution (LTE) system, a Fifth Generation (5G)-New Radio (NR) system, or a Wireless Local Area Network (WLAN) system can be used, but the communication system is not limited thereto.

Further, the uplink operating band means a frequency range designated for uplink operation within a band stated above. Further, the downlink operating band means a frequency range designated for downlink operation within a band stated above.

Antenna connection terminal 100 and low-noise amplifiers 42 and 43 may not be disposed on module board 10. Antenna connection terminal 150 and low-noise amplifiers 82 and 83 may not be disposed on module board 50.

Figures 2, 3:
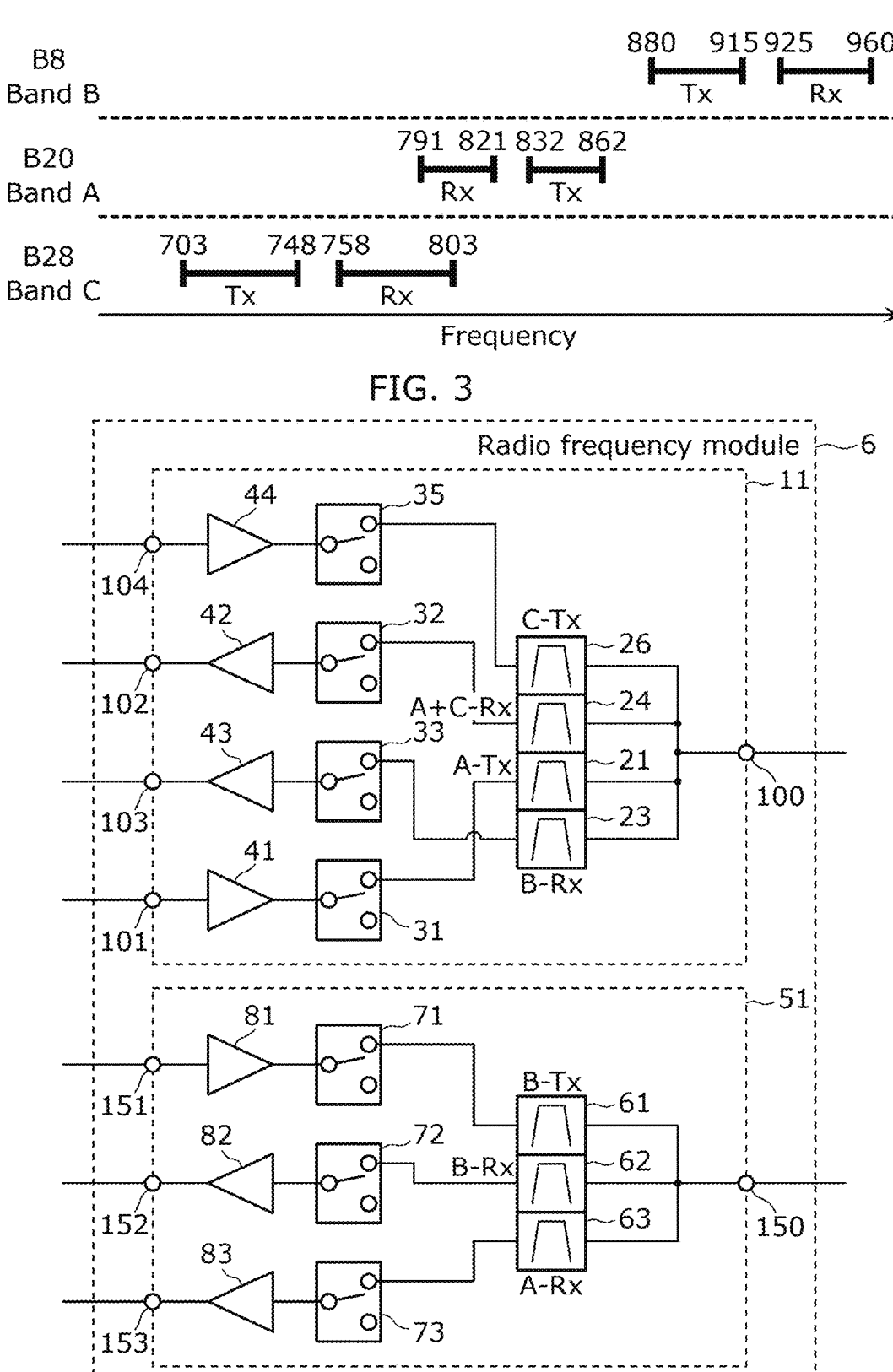
FIG. 2 illustrates examples of combinations of bands applied to the radio frequency module according to the embodiment.
FIG. 3 illustrates a circuit configuration of a radio frequency module according to Variation 1 of the embodiment.

FIG. 2 illustrates examples of combinations of bands applied to radio frequency module 1 according to the embodiment.

In radio frequency module 1 according to the exemplary embodiment, band A is, for example, band B20 for 4G-LTE (first downlink operating band: 791 MHz to 821 MHz, first uplink operating band: 832 MHz to 862 MHz), and band B is, for example, band n8 for 5G-NR (second uplink operating band: 880 MHz to 915 MHz, second downlink operating band: 925 MHz to 960 MHz). Further, band A may be, for example, band n20 for 5G-NR (first downlink operating band: 791 MHz to 821 MHz, first uplink operating band: 832 MHz to 862 MHz), and band B may be, for example, band B8 for 4G-LTE (second uplink operating band: 880 MHz to 915 MHz, second downlink operating band: 925 MHz to 960 MHz).

As illustrated in FIG. 2, in band A (B20 or n20) and band B (B8 or n8), the first downlink operating band, the first uplink operating band, the second uplink operating band, and the second downlink operating band are listed in the ascending order of frequency.

Note that although not illustrated in FIGS. 2, band A may be, for example, band B5 for 4G-LTE (first downlink operating band: 869 MHz to 894 MHz, first uplink operating band: 824 MHz to 849 MHz), and band B may be, for example, band n13 for 5G-NR (second uplink operating band: 777 MHz to 787 MHz, second downlink operating band: 746 MHz to 756 MHz). Further, band A may be, for example, band n5 for 5G-NR (first downlink operating band: 869 MHz to 894 MHz, first uplink operating band: 824 MHz to 849 MHz), and band B may be, for example, band B13 for 4G-LTE (second uplink operating band: 777 MHz to 787 MHz, second downlink operating band: 746 MHz to 756 MHz). In this case, in band A (B5 or n5) and band B (B13 or n13), the first downlink operating band, the first uplink operating band, the second uplink operating band, and the second downlink operating band are listed in the descending order of frequency.

Further, band A and band B may be bands which belong to a low band group (700 MHz to 1 GHz) and in which the first downlink operating band, the first uplink operating band, the second uplink operating band, and the second downlink operating band are listed in the frequency order.

Band A may be a band for time division duplex (TDD) that includes the first uplink operating band and the first downlink operating band, and band B may be a band for FDD that includes the second uplink operating band and the second downlink operating band. In this case, the first downlink operating band and the first uplink operating band have the same frequency range.

Band A may be a band for FDD that includes the first uplink operating band and the first downlink operating band, and band B may be a band for TDD that includes the second uplink operating band and the second downlink operating band. In this case, the second downlink operating band and the second uplink operating band have the same frequency range.

Referring back to FIG. 1, a circuit configuration of radio frequency module 1 is to be described.

Switch 30 is an example of a first switch and includes two single pole single throw (SPST) switch elements (a first switch element and a second switch element). Common terminal 30a that is one terminal of each switch element is connected to antenna connection terminal 100. Selection terminal 30b that is the other terminal of the first switch element is connected to the first common terminal. Selection terminal 30c that is the other terminal of the second switch element is connected to filter 23. This connection configuration allows switch 30 to switch between connection and disconnection of antenna connection terminal 100 to/from the first common terminal, and to switch between connection and disconnection of antenna connection terminal 100 to/from filter 23, based on a control signal from RFIC 3, for example. Note that the number of switch elements included in switch 30 is determined as appropriate according to the number of filters included in radio frequency module 1.

Switch 70 is an example of a second switch and includes two SPST switch elements (a third switch element and a fourth switch element). Common terminal 70a that is one terminal of each switch element is connected to antenna connection terminal 150. Selection terminal 70b that is the other terminal of the third switch element is connected to the second common terminal. Selection terminal 70c that is the other terminal of the fourth switch element is connected to filter 63. This connection configuration allows switch 70 to switch between connection and disconnection of antenna connection terminal 150 to/from the second common terminal, and to switch between connection and disconnection of antenna connection terminal 150 to/from filter 63, based on a control signal from RFIC 3, for example. Note that the number of switch elements included in switch 70 is determined as appropriate according to the number of filters included in radio frequency module 1.

Switch 31 is connected between filter 21 and power amplifier 41, and includes at least one SPST switch element. Switch 31 switches between connection and disconnection of filter 21 to/from power amplifier 41, based on a control signal from RFIC 3, for example.

Switch 32 is connected between filter 22 and low-noise amplifier 42, and includes at least one SPST switch element. Switch 32 switches between connection and disconnection of filter 22 to/from low-noise amplifier 42, based on a control signal from RFIC 3, for example.

Switch 33 is connected between filter 23 and low-noise amplifier 43, and includes at least one SPST switch element. Switch 33 switches between connection and disconnection of filter 23 to/from low-noise amplifier 43, based on a control signal from RFIC 3, for example.

Switch 71 is connected between filter 61 and power amplifier 81, and includes at least one SPST switch element. Switch 71 switches between connection and disconnection of filter 61 to/from power amplifier 81, based on a control signal from RFIC 3, for example.

Switch 72 is connected between filter 62 and low-noise amplifier 82, and includes at least one SPST switch element. Switch 72 switches between connection and disconnection of filter 62 to/from low-noise amplifier 82, based on a control signal from RFIC 3, for example.

Switch 73 is connected between filter 63 and low-noise amplifier 83, and includes at least one SPST switch element. Switch 73 switches between connection and disconnection of filter 63 to/from low-noise amplifier 83, based on a control signal from RFIC 3, for example.

Switches 30 to 33 are disposed on module board 10, and switches 70 to 73 are disposed on module board 50. Note that switches 30 to 33 may not be disposed on module board 10, and switches 70 to 73 may not be disposed on module board 50.

Note that some of the circuit elements illustrated in FIG. 1 may not be included in radio frequency module 1. For example, radio frequency module 1 may include at least filters 21 to 23 and 61 to 63 and power amplifiers 41 and 81, and may not include other circuit elements.

With the circuit configuration as described above, radio frequency module 1 can execute at least (1) primary transmission and reception of signals in band A (via filters 21 and 22) on module board 10, (2) primary transmission and reception of signals in band B (via filters 61 and 62) on module board 50 and diversity reception of signals in band B (via filter 23) on module board 10, and (3) primary transmission and reception of signals in band A (via filters 21 and 22) and diversity reception of signals in band B (via filter 23) on module board 10, and primary transmission and reception of signals in band B (via filters 61 and 62) and diversity reception of signals in band A (via filter 63) on module board 50.

In the case of (3) above, a signal in band A and a signal in band B are simultaneously transmitted, and Evolved Universal Terrestrial Radio Access Network (E-UTRAN) New Radio-dual connectivity (EN-DC) in which, for example, band A is band B20 for 4G-LTE and band B is band n8 for 5G-NR can be used. Alternatively, EN-DC in which band A is band n20 for 5G-NR and band B is band B8 for 4G-LTE can be used.

Here, in band A and band B, the first downlink operating band, the first uplink operating band, the second uplink operating band, and the second downlink operating band are listed in the frequency order. Thus, a transmission band (center frequency: f1) in which high-power transmission signals in band A are output is adjacent to a transmission band (center frequency: f2) in which high-power transmission signals in band B are output, and receiving bands (ΔRx1 and ΔRx2) are in the vicinity of the transmission bands. Accordingly, frequencies (2×f1−f2 and 2×f2−f1) of third-order intermodulation distortion (IMD3) generated assuming a transmission signal in band A and a transmission signal in band B are simultaneously transmitted are assumed to be included in at least one of receiving band ΔRx1 or ΔRx2.

To address this, according to the configuration of radio frequency module 1 according to the exemplary embodiment, a transmission path for band A (power amplifier 41+filter 21) and a transmission path for band B (power amplifier 81+filter 61) are provided on different boards, and thus IMD3 generated assuming a signal in band A and a signal in band B are simultaneously transmitted can be decreased. Thus, spurious waves due to IMD3 can be prevented from sneaking into reception paths for band A (filter 22+low-noise amplifier 42 and filter 63+low-noise amplifier 83) and/or reception paths for band B (filter 23+low-noise amplifier 43 and filter 62+low-noise amplifier 82), and a decrease in reception sensitivity for band A and/or band B can be reduced.

Assuming (3) above is executed, on module board 10, filters 21 to 23 should be simultaneously connected to antenna connection terminal 100. Yet, the passband of filter 23 (the second downlink operating band) is not between the transmission band in band A (the first uplink operating band) and the receiving band therein (the first downlink operating band), but is higher or lower in frequency than band A. Accordingly, impedance in the second downlink operating band in band B can be more readily adjusted to be open than band A. Thus, deterioration in characteristics of filters 21 to 23 assuming filters 21 to 23 are simultaneously connected can be reduced. On module board 50, filters 61 to 63 should be simultaneously connected to antenna connection terminal 150. Yet, the passband of filter 63 (the first downlink operating band) is not between the transmission band in band B (the second uplink operating band) and the receiving band therein (the second downlink operating band), but is lower or higher in frequency than band B. Accordingly, impedance in the first downlink operating band can be more readily adjusted to be open than band B. Thus, deterioration in characteristics of filters 61 to 63 assuming filters 61 to 63 are simultaneously connected can be reduced.

[1.3 Circuit Configuration of Radio Frequency Module 6 According to Variation 1]

Next, a circuit configuration of radio frequency module 6 according to Variation 1 is to be described with reference to FIG. 3.

FIG. 3 illustrates a circuit configuration of radio frequency module 6 according to Variation 1 of the embodiment. As illustrated in FIG. 3, radio frequency module 6 includes module boards 11 and 51, filters 21, 23, 24, 26, 61, 62, and 63, power amplifiers 41, 44, and 81, low-noise amplifiers 42, 43, 82, and 83, switches 31, 32, 33, 35, 71, 72, and 73, antenna connection terminals 100 and 150, radio frequency input terminals 101, 104, and 151, and radio frequency output terminals 102, 103, 152, and 153. Radio frequency module 6 according to this variation is different from radio frequency module 1 according to the embodiment in that switches 30 and 70 are not disposed, filter 24 is disposed instead of filter 22, and filter 26, switch 35, and power amplifier 44 are added. The following description of radio frequency module 6 according to this variation focuses on differences from radio frequency module 1 according to the embodiment while a description of the same points is omitted.

Module boards 11 and 51 are boards on which circuit components included in radio frequency module 6 are mounted. As module boards 11 and 51, boards having a stacked structure of a plurality of dielectric layers are used, such an LTCC board, an HTCC board, a component-embedded board, a board that includes an RDL, and a printed circuit board, for example. Module boards 11 and 51 may be of different types of such boards. Note that module boards 11 and 51 are not included in a single continuous board, and are separate boards.

Filter 21 is an example of the first filter, and has a passband that includes the first uplink operating band in band A for FDD. Filter 21 is connected to antenna connection terminal 100. Filter 24 is an example of the second filter, and has a passband that includes the first downlink operating band in band A and a third downlink operating band in band C. Filter 24 is connected to antenna connection terminal 100. Filter 23 is an example of the third filter, and has a passband that includes the second downlink operating band in band B. Filter 23 is connected to antenna connection terminal 100. Filter 26 has a passband that includes a third uplink operating band in band C. Filter 26 is connected to antenna connection terminal 100. Thus, the output terminal of filter 21, the input terminal of filter 24, the input terminal of filter 23, and the output terminal of filter 26 are directly connected. Filters 21, 23, 24, and 26 are included in a quadplexer.

Filter 61 is an example of the fourth filter, and has a passband that includes the second uplink operating band in band B for FDD. Filter 61 is connected to antenna connection terminal 150. Filter 62 is an example of the fifth filter, and has a passband that includes the second downlink operating band in band B. Filter 62 is connected to antenna connection terminal 150. Filter 63 is an example of the sixth filter, and has a passband that includes the first downlink operating band in band A. Filter 63 is connected to antenna connection terminal 150. Thus, the output terminal of filter 61, the input terminal of filter 62, and the input terminal of filter 63 are directly connected. Filters 61 to 63 are included in a triplexer.

Filters 21, 23, 24, and 26, power amplifiers 41 and 44, low-noise amplifiers 42 and 43, and antenna connection terminal 100 are disposed on module board 11. Filters 61, 62, and 63, power amplifier 81, low-noise amplifiers 82 and 83, and antenna connection terminal 150 are disposed on module board 51 different from module board 11.

With this configuration, no switch is necessary on module board 11 to switch between connection and disconnection of filters 21, 23, 24, and 26 to/from antenna 2a, and no switch is necessary on module board 51 to switch between connection and disconnection of filters 61 to 63 to/from antenna 2b. Thus, the size of radio frequency module 6 can be reduced.

Note that in radio frequency module 6 according to this variation, band A is band B20 for 4G-LTE or band n20 for 5G-NR, for example, band B is band B8 for 4G-LTE or band n8 for 5G-NR, for example, and band C is band B28 for 4G-LTE or band n28 for 5G-NR (the third uplink operating band: 703 MHz to 748 MHz, and the third downlink operating band: 758 MHz to 803 MHz), for example.

Note that in radio frequency module 6 according to this variation, filter 22 having a passband that includes the first downlink operating band in band A may be disposed instead of filter 24, and furthermore, a filter having a passband that includes the third downlink operating band in band C may be disposed, being connected to antenna connection terminal 100. In this case, filters 21, 22, 23, and 26, and the filter having a passband that includes the third downlink operating band in band C may be included in a pentaplexer.

Radio frequency module 6 according to this variation may be configured not to transfer signals in band C. Thus, radio frequency module 6 may not include filter 26, switch 35, or power amplifier 44, filter 22 may be disposed instead of filter 24, and filters 21, 22, and 23 may be included in a triplexer.

In this case, radio frequency module 6 can transmit signals in band A and signals in band B, band A may include the first uplink operating band and the first downlink operating band, band B may include the second uplink operating band and the second downlink operating band, the first downlink operating band may be lower or higher in frequency than both the first uplink operating band and the second uplink operating band, and the second downlink operating band may be lower or higher in frequency than both the first uplink operating band and the second uplink operating band.

Further, in this case, band A may be, for example, band B13 for 4G-LTE or band n13 for 5G-NR (first downlink operating band: 746 MHz to 756 MHz, first uplink operating band: 777 MHz to 787 MHz), and band B may be, for example, band B14 for 4G-LTE or band n14 for 5G-NR (second downlink operating band: 758 MHz to 768 MHz, first downlink operating band: 788 MHz to 798 MHz).

1.4 Circuit Configuration of Radio Frequency Module 7 According to Variation 2

Next, a circuit configuration of radio frequency module 7 according to Variation 2 is to be described with reference to FIG. 4.

Figure 4:
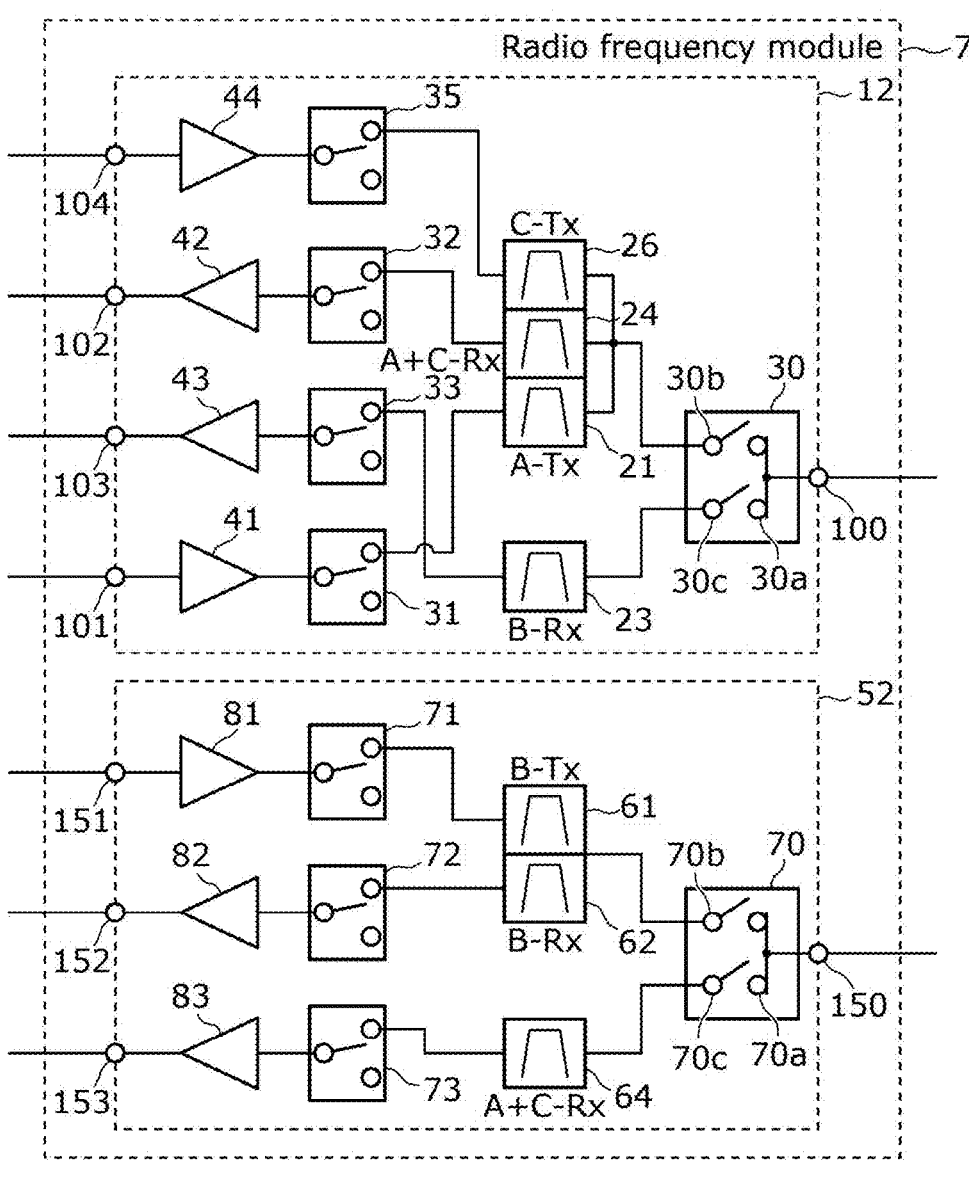
FIG. 4 illustrates a circuit configuration of a radio frequency module according to Variation 2 of the embodiment.

FIG. 4 illustrates a circuit configuration of radio frequency module 7 according to Variation 2 of the embodiment. As illustrated in FIG. 4, radio frequency module 7 includes module boards 12 and 52, filters 21, 23, 24, 26, 61, 62, and 64, power amplifiers 41, 44, and 81, low-noise amplifiers 42, 43, 82, and 83, switches 30, 31, 32, 33, 35, 70, 71, 72, and 73, antenna connection terminals 100 and 150, radio frequency input terminals 101, 104, and 151, and radio frequency output terminals 102, 103, 152, and 153. Radio frequency module 7 according to this variation is different from radio frequency module 1 according to the embodiment in the configurations of filters 24 and 64 and in that filter 26, switch 35, and power amplifier 44 are added. The following description of radio frequency module 7 according to this variation focuses on differences from radio frequency module 1 according to the embodiment while a description of the same points is omitted.

Module boards 12 and 52 are boards on which circuit components included in radio frequency module 7 are mounted. As module boards 12 and 52, boards having a stacked structure of a plurality of dielectric layers are used, such an LTCC board, an HTCC board, a component-embedded board, a board that includes an RDL, and a printed circuit board, for example. Module boards 12 and 52 may be of different types of such boards. Note that module boards 12 and 52 are not included in a single continuous board, and are separate boards.

Filter 21 is an example of the first filter, and has a passband that includes the first uplink operating band in band A for FDD. Filter 21 is connected to antenna connection terminal 100 via switch 30.

Filter 24 is an example of the second filter, and has a passband that includes the first downlink operating band in band A and the third downlink operating band in band C (a third band). Filter 24 is connected to antenna connection terminal 100 via switch 30.

Filter 26 has a passband that includes the third uplink operating band in band C. Filter 26 is connected to antenna connection terminal 100 via switch 30.

Filters 21 and 24 are included in a duplexer for band A, which includes a first common terminal. Furthermore, filters 21, 24, and 26 are included in a triplexer for band A and band C.

Filter 23 is an example of the third filter, and has a passband that includes the second downlink operating band in band B for FDD. Filter 23 is connected to antenna connection terminal 100 via switch 30.

Filter 61 is an example of the fourth filter, and has a passband that includes the second uplink operating band in band B. Filter 61 is connected to antenna connection terminal 150 via switch 70.

Filter 62 is an example of the fifth filter, and has a passband that includes the second downlink operating band in band B. Filter 62 is connected to antenna connection terminal 150 via switch 70.

Filters 61 and 62 are included in a duplexer for band B, which includes a second common terminal.

Filter 64 is an example of the sixth filter, and has a passband that includes the first downlink operating band in band A and the third downlink operating band in band C (the third band). Filter 64 is connected to antenna connection terminal 150 via switch 70.

Power amplifier 44 can amplify a transmission signal in band C that is input through radio frequency input terminal 104. Power amplifier 44 is connected to filter 26 via switch 35.

Low-noise amplifier 42 amplifies reception signals in band A and band C, which are input through antenna connection terminal 100. Low-noise amplifier 42 is connected between radio frequency output terminal 102 and switch 32. Low-noise amplifier 83 amplifies reception signals in band A and band C, which are input through antenna connection terminal 150. Low-noise amplifier 83 is connected between radio frequency output terminal 153 and switch 73.

Filters 21, 23, and 24, power amplifiers 41 and 44, low-noise amplifiers 42 and 43, and antenna connection terminal 100 are disposed on module board 12. Filters 61, 62, and 64, power amplifier 81, low-noise amplifiers 82 and 83, and antenna connection terminal 150 are disposed on module board 52 different from module board 12.

In radio frequency module 7 according to this variation, band A is band B20 for 4G-LTE or band n20 for 5G-NR, for example, band B is band B8 for 4G-LTE or band n8 for 5G-NR, for example, and band C is band B28 for 4G-LTE or band n28 for 5G-NR (the third uplink operating band: 703 MHz to 748 MHz, the third downlink operating band: 758 MHz to 803 MHz).

As illustrated in FIG. 2, the first downlink operating band (791 MHz to 821 MHz) in band A (B20 or n20) at least partially overlaps the third downlink operating band (758 MHz to 803 MHz) of band C (B28 or n28).

According to the above configuration, filters 24 and 64 also serve as a filter for the first downlink operating band and a filter for the third downlink operating band, respectively, and thus small radio frequency module 7 that can perform multiband transfer for signals in band A, band B, and band C can be produced.

Note that in radio frequency module 7 according to this variation, filter 22 having a passband that includes the first downlink operating band in band A may be disposed instead of filter 24, and furthermore, a filter having a passband that includes the third downlink operating band in band C may be disposed, being connected to antenna connection terminal 100 via switch 30. In this case, filters 21, 22, and 26, and the filter having a passband that includes the third downlink operating band in band C may be included in a quadplexer.

1.5 Circuit Configuration of Radio Frequency Module 8 According to Variation 3

Next, a circuit configuration of radio frequency module 8 according to Variation 3 is to be described with reference to FIG. 5.

Figure 5:
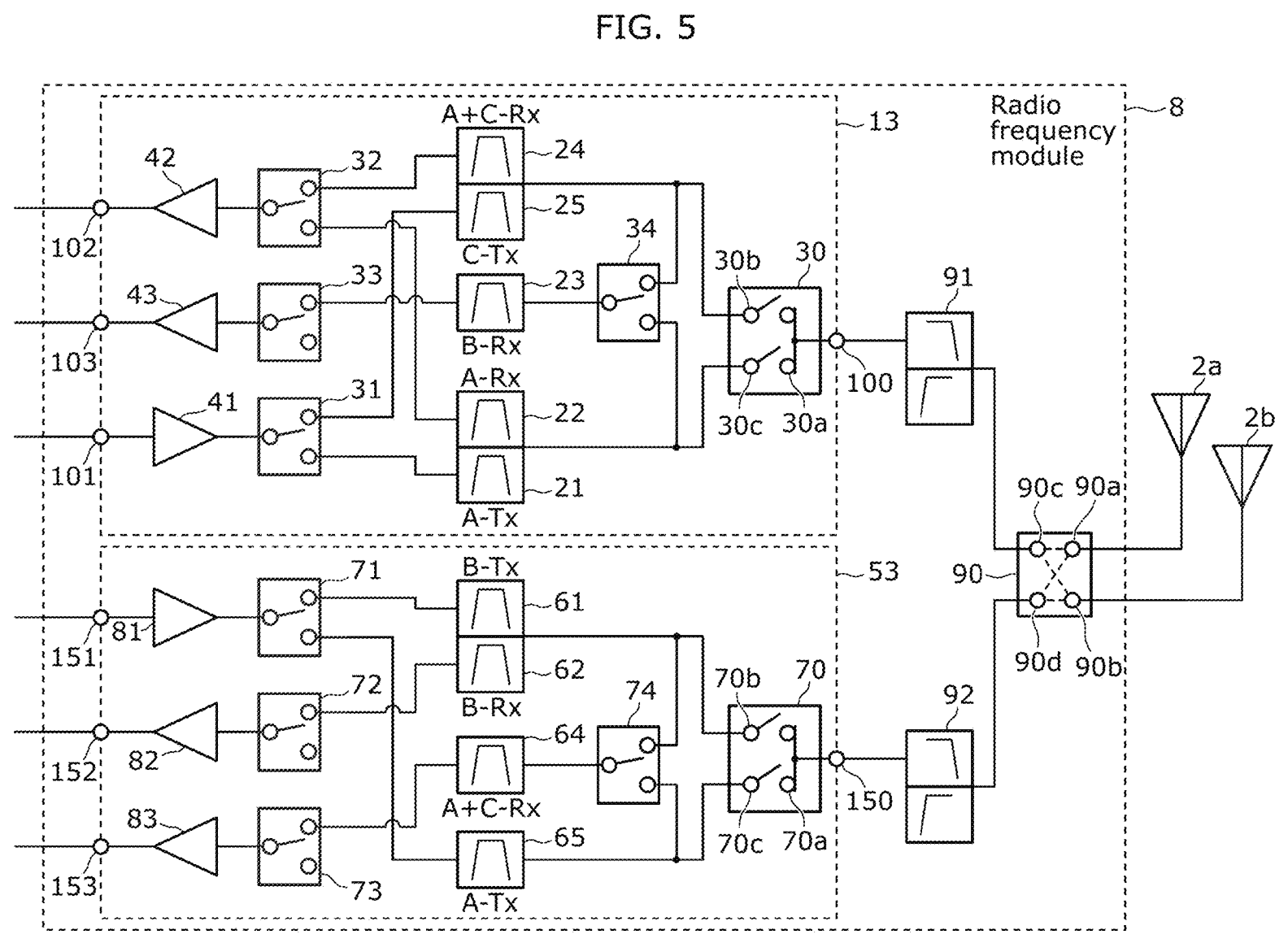

FIG. 5 illustrates a circuit configuration of radio frequency module 8 according to Variation 3 of the embodiment. As illustrated in FIG. 5, radio frequency module 8 includes module boards 13 and 53, filters 21, 22, 23, 24, 25, 61, 62, 64, and 65, power amplifiers 41 and 81, low-noise amplifiers 42, 43, 82, and 83, switches 30, 31, 32, 33, 34, 70, 71, 72, 73, 74, and 90, diplexers 91 and 92, antenna connection terminals 100 and 150, radio frequency input terminals 101 and 151, and radio frequency output terminals 102, 103, 152, and 153. Radio frequency module 8 according to this variation is different from radio frequency module 1 according to the embodiment in that switches 34, 74, and 90, diplexers 91 and 92, and filters 24, 25, 64, and 65 are added. The following description of radio frequency module 8 according to this variation focuses on differences from radio frequency module 1 according to the embodiment while a description of the same points is omitted.

Antenna connection terminal 100 is connected to one of antenna 2a or antenna 2b via diplexer 91 and switch 90, and antenna connection terminal 150 is connected to the other one of antenna 2a or antenna 2b via diplexer 92 and switch 90.

Diplexer 91 includes a low-pass filter and a high-pass filter, and the low-pass filter is connected between antenna connection terminal 100 and switch 90. Diplexer 92 includes a low-pass filter and a high-pass filter, and the low-pass filter is connected between antenna connection terminal 150 and switch 90. Note that the low-pass filters included in diplexers 91 and 92 each have, for example, a low band group (700 MHz to 1 GHz) as a passband, and an attenuation band higher in frequency than the low band group. Further, the high-pass filters included in diplexers 91 and 92 each have, for example, a low band group (700 MHz to 1 GHz) as an attenuation band, and a passband higher in frequency than the low band group.

Switch 90 includes terminals 90a, 90b, 90c, and 90d. Terminal 90a is connected to antenna 2a, and terminal 90b is connected to antenna 2b. Terminal 90c is connected to antenna connection terminal 100 via diplexer 91, and terminal 90d is connected to antenna connection terminal 150 via diplexer 92. Switch 90 mutually exclusively selects conduction between terminals 90a and 90c or conduction between terminals 90a and 90d, and mutually exclusively selects conduction between terminals 90b and 90c or conduction between terminals 90b and 90d. Switch 90 is a double-pole double-throw (DPDT) switch circuit that includes terminals 90a to 90d, for example. Note that switch 90 may be a double-pole triple-throw (DP3T) or double-pole quadruple-throw (DP4T) switch circuit, and in this case, a necessary number of terminals may be used according to the number of bands to be used.

Since switch 90 is disposed, connection of antenna connection terminals 100 and 150 to antennas 2a and 2b can be switched according to a combination of bands for transferring signals.

Note that radio frequency module 8 may not include diplexers 91 and 92 or switch 90. In this case, antenna connection terminal 100 is connected to antenna 2a, and antenna connection terminal 150 is connected to antenna 2b.

In this variation, as illustrated in FIG. 2, the first downlink operating band (791 MHz to 821 MHz) of band A (B20 or n20) at least partially overlaps the third downlink operating band (758 MHz to 803 MHz) of band C (B28 or n28).

Module boards 13 and 53 are boards on which circuit components included in radio frequency module 8 are mounted. As module boards 13 and 53, boards having a stacked structure of a plurality of dielectric layers are used, such an LTCC board, an HTCC board, a component-embedded board, a board that includes an RDL, and a printed circuit board, for example. Module boards 13 and 53 may be of different types of such boards. Note that module boards 13 and 53 are not included in a single continuous board, and are separate boards.

Filter 21 is an example of the first filter, and has a passband that includes the first uplink operating band in band A. Filter 21 is connected to antenna connection terminal 100 via switch 30.

Filter 22 is an example of the second filter, and has a passband that includes the first downlink operating band in band A. Filter 22 is connected to antenna connection terminal 100 via switch 30.

Filters 21 and 22 are included in a duplexer for band A, which includes a first common terminal.

Filter 23 is an example of the third filter, and has a passband that includes the second downlink operating band in band B. Filter 23 is connected to antenna connection terminal 100 via switches 34 and 30.

Filter 24 is an example of an eighth filter, and has a passband that includes the third downlink operating band in band C and the first downlink operating band in band A. Filter 24 is connected to antenna connection terminal 100 via switch 30. Note that the passband of filter 24 may include the third downlink operating band in band C, and may not include a portion of the first downlink operating band in band A.

Filter 25 is an example of a seventh filter, and has a passband that includes the third uplink operating band in band C. Filter 25 is connected to antenna connection terminal 100 via switch 30.

Filters 24 and 25 are included in a duplexer for band C, which includes a third common terminal.

Filter 61 is an example of the fourth filter, and has a passband that includes the second uplink operating band in band B. Filter 61 is connected to antenna connection terminal 150 via switch 70.

Filter 62 is an example of the fifth filter, and has a passband that includes the second downlink operating band in band B. Filter 62 is connected to antenna connection terminal 150 via switch 70.

Filters 61 and 62 are included in a duplexer for band B, which includes a second common terminal.

Filter 64 is an example of the sixth filter, and has a passband that includes the first downlink operating band in band A and the third downlink operating band in band C. Filter 64 is connected to antenna connection terminal 150 via switches 74 and 70.

Filter 65 is an example of a ninth filter, and has a passband that includes the first uplink operating band in band A. Filter 65 is connected to antenna connection terminal 150 via switch 70.

Power amplifier 41 is an example of the first power amplifier, and can amplify transmission signals in band A and band C, which are input through radio frequency input terminal 101. Power amplifier 41 is connected to filters 21 and 25 via switch 31.

Low-noise amplifier 42 amplifies reception signals in band A and band C, which are input through antenna connection terminal 100. Low-noise amplifier 42 is connected between radio frequency output terminal 102 and switch 32, and is connected to filters 22 and 24 via switch 32.

Low-noise amplifier 43 amplifies a reception signal in band B, which is input through antenna connection terminal 100. Low-noise amplifier 43 is connected between radio frequency output terminal 103 and switch 33.

Power amplifier 81 is an example of the second power amplifier, and can amplify transmission signals in band B and band A, which are input through radio frequency input terminal 151. Power amplifier 81 is connected to filters 61 and 65 via switch 71.

Low-noise amplifier 82 amplifies reception signals in band B, which are input through antenna connection terminal 150. Low-noise amplifier 82 is connected between radio frequency output terminal 152 and switch 72.

Low-noise amplifier 83 amplifies reception signals in band A and band C, which are input through antenna connection terminal 150. Low-noise amplifier 83 is connected between radio frequency output terminal 153 and switch 73, and is connected to filter 64 via switch 73.

Filters 21, 22, 23, 24, and 25, power amplifier 41, low-noise amplifiers 42 and 43, and antenna connection terminal 100 are disposed on module board 13. Filters 61, 62, 64, and 65, power amplifier 81, low-noise amplifiers 82 and 83, and antenna connection terminal 150 are disposed on module board 53 different from module board 13.

Switch 30 is an example of the first switch, and includes two SPST switch elements (a first switch element and a second switch element). Common terminal 30*a* that is one terminal of each switch element is connected to antenna connection terminal 100. Selection terminal 30*b* that is the other terminal of the first switch element is connected to the third common terminal. Selection terminal 30*c* that is the other terminal of the second switch element is connected to the first common terminal. This configuration allows switch 30 to switch between connection and disconnection of antenna connection terminal 100 to/from the third common terminal, and to switch between connection and disconnection of antenna connection terminal 100 to/from the first common terminal, based on a control signal from RFIC 3, for example.

Switch 70 is an example of the second switch and includes two SPST switch elements (a third switch element and a fourth switch element). Common terminal 70*a* that is one terminal of each switch element is connected to antenna connection terminal 150. Selection terminal 70*b* that is the other terminal of the third switch element is connected to the second common terminal. Selection terminal 70*c* that is the other terminal of the fourth switch element is connected to filter 65. This configuration allows switch 70 to switch between connection and disconnection of antenna connection terminal 150 to/from the second common terminal, and to switch between connection and disconnection of antenna connection terminal 150 to/from filter 65, based on a control signal from RFIC 3, for example.

Switch 31 is connected between power amplifier 41 and filters 21 and 25, and includes a common terminal and two selection terminals. Switch 31 switches connection of power amplifier 41 between filter 21 and filter 25, based on a control signal from RFIC 3, for example.

Switch 32 is connected between low-noise amplifier 42 and filters 22 and 24, and includes a common terminal and two selection terminals. Switch 32 switches connection of low-noise amplifier 42 between filter 22 and filter 24, based on a control signal from RFIC 3, for example.

Switch 33 is connected between filter 23 and low-noise amplifier 43, and includes at least one SPST switch element. Switch 33 switches between connection and disconnection of filter 23 to/from low-noise amplifier 43, based on a control signal from RFIC 3, for example.

Switch 71 is connected between power amplifier 81 and filters 61 and 65, and includes a common terminal and two selection terminals. Switch 71 switches connection of power amplifier 81 between filter 61 and filter 65, based on a control signal from RFIC 3, for example.

Switch 72 is connected between filter 62 and low-noise amplifier 82, and includes at least one SPST switch element. Switch 72 switches between connection and disconnection of filter 62 to/from low-noise amplifier 82, based on a control signal from RFIC 3, for example.

Switch 73 is connected between filter 64 and low-noise amplifier 83, and includes at least one SPST switch element. Switch 73 switches between connection and disconnection of filter 64 to/from low-noise amplifier 83, based on a control signal from RFIC 3, for example.

Switch 34 is an example of the third switch, is connected between an input terminal of filter 23 and switch 30, and includes a common terminal and two selection terminals. The common terminal of switch 34 is connected to filter 23, one selection terminal of switch 34 is connected to the third common terminal and selection terminal 30*b*, and the other selection terminal of switch 34 is connected to the first common terminal and selection terminal 30*c*. Switch 34 switches connection of filter 23 between (i) filters 24 and and switch 30 and (ii) filters 21 and 22 and switch 30, based on a control signal from RFIC 3, for example.

Switch 74 is an example of the fourth switch, is connected between an input terminal of filter 64 and switch 70, and includes a common terminal and two selection terminals. The common terminal of switch 74 is connected to filter 64, one selection terminal of switch 74 is connected to the second common terminal and selection terminal 70*b*, and the other selection terminal of switch 74 is connected to filter 65 and selection terminal 70*c*. Switch 74 switches connection of filter 64 between (i) filters 61 and 62 and switch 70 and (ii) filter 65 and switch 70, based on a control signal from RFIC 3, for example.

Switches 30 to 34 are disposed on module board 13, and switches 70 to 74 are disposed on module board 53. Note that switches 30 to 34 may not be disposed on module board 13, and switches 70 to 74 may not be disposed on module board 53.

Note that some of the circuit elements illustrated in FIG. 5 may not be included in radio frequency module 8. For example, radio frequency module 8 may include at least filters 21 to 25, 61, 62, 64, and 65, and power amplifiers 41 and 81, and may not include other circuit elements.

With the circuit configuration as described above, radio frequency module 8 can execute at least (1) primary transmission and reception of signals in band A and diversity reception of signals in band B on module board 13, and primary transmission and reception of signals in band B and diversity reception of signals in band B on module board 53, (2) primary transmission and reception of signals in band C, primary reception of signals in band A and diversity reception of signals in band B on module board 13, and primary transmission and reception of signals in band B, diversity reception of signals in band A, and diversity reception of signals in band C on module board 53, and (3) primary transmission and reception of signals in band C, primary reception of signals in band B, and diversity reception of signals in band A on module board 13, and primary transmission and reception of signals in band A, diversity reception of signals in band B, and diversity reception of signals in band C on module board 53. In the following, flows of signals in radio frequency module 8 in (1) to (3) above are to be described.

Figure 6A:
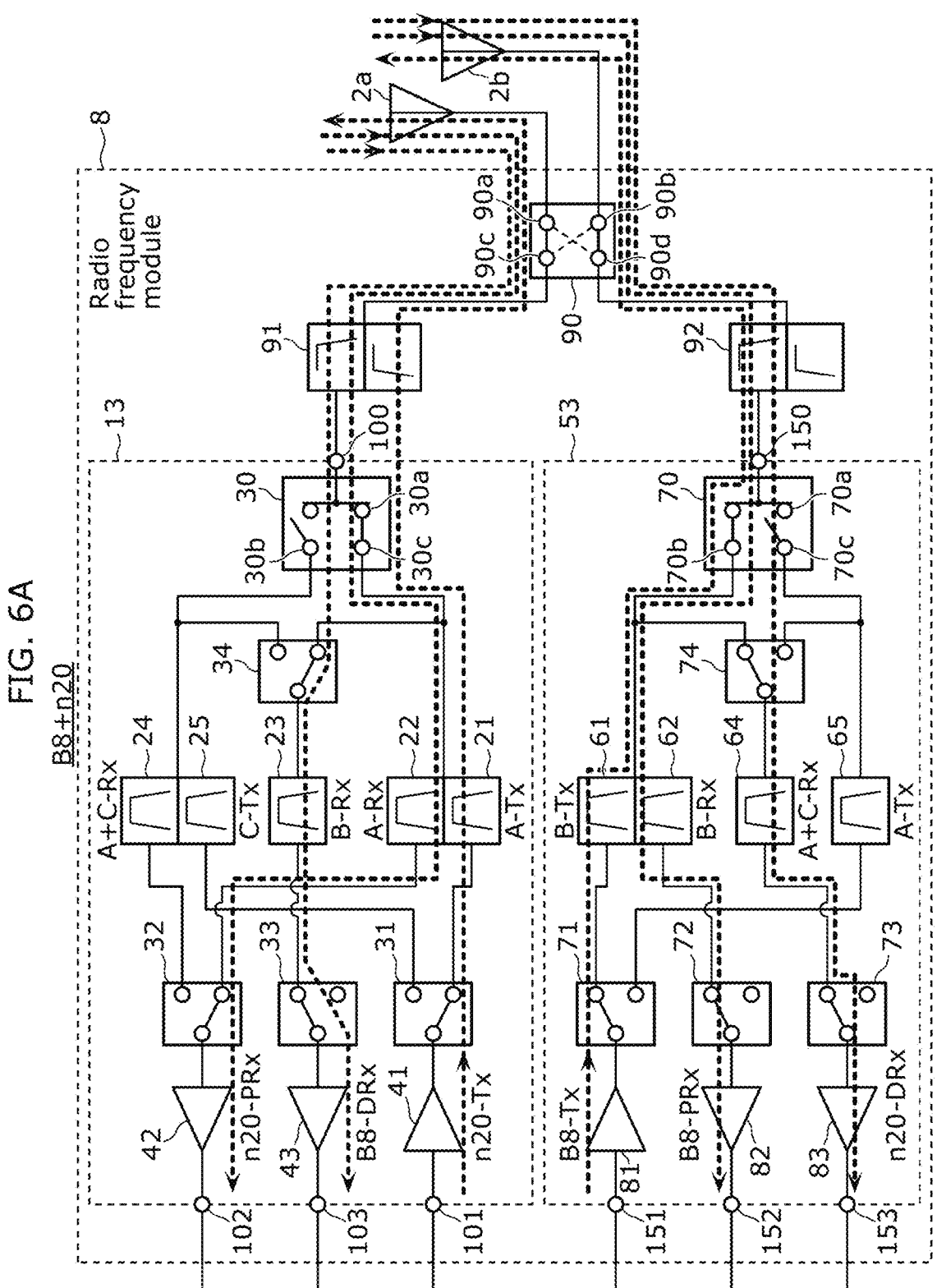
FIG. 6A illustrates a first circuit state of the radio frequency module according to Variation 3 of the embodiment.

FIG. 6A illustrates a first circuit state of radio frequency module 8 according to Variation 3 of the embodiment. The first circuit state corresponds to (1) above. For example, band n20 for 5G-NR is applied as band A and, for example, band B8 for 4G-LTE is applied as band B.

As illustrated in FIG. 6A, with the switching made by the switches, a transmission signal (n20-Tx) in band n20 for 5G-NR is output to antenna 2a through radio frequency input terminal 101, power amplifier 41, switch 31, filter 21, switch 30, diplexer 91, and switch 90. Further, a primary reception signal (n20-PRx) in band n20 for 5G-NR is output to RFIC 3 through antenna 2a, switch 90, diplexer 91, switch 30, filter 22, switch 32, low-noise amplifier 42, and radio frequency output terminal 102. Further, a diversity reception signal (B8-DRx) in band B8 for 4G-LTE is output to RFIC 3 through antenna 2a, switch 90, diplexer 91, switch 30, switch 34, filter 23, switch 33, low-noise amplifier 43, and radio frequency output terminal 103.

As illustrated in FIG. 6A, with the switching made by the switches, a transmission signal (B8-Tx) in band B8 for 4G-LTE is output to antenna 2b through radio frequency input terminal 151, power amplifier 81, switch 71, filter 61, switch 70, diplexer 92, and switch 90. Further, a primary reception signal (B8-PRx) in band B8 for 4G-LTE is output to RFIC 3 through antenna 2b, switch 90, diplexer 92, switch 70, filter 62, switch 72, low-noise amplifier 82, and radio frequency output terminal 152. Further, a diversity reception signal (n20-DRx) in band n20 for 5G-NR is output to RFIC 3 through antenna 2b, switch 90, diplexer 92, switch 70, switch 74, filter 64, switch 73, low-noise amplifier 83, and radio frequency output terminal 153.

Figure 6B:
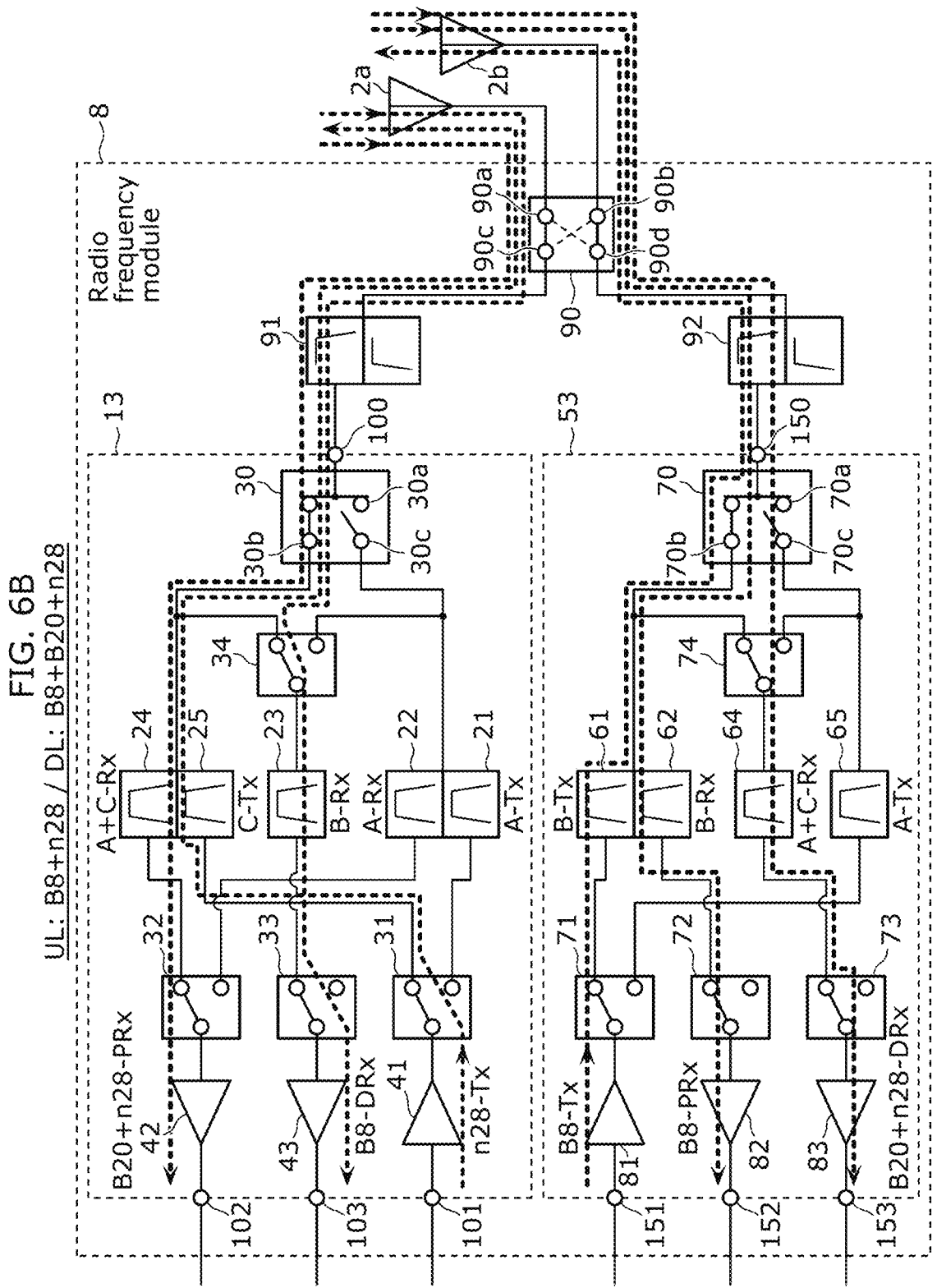
FIG. 6B illustrates a second circuit state of the radio frequency module according to Variation 3 of the embodiment.

FIG. 6B illustrates a second circuit state of radio frequency module 8 according to Variation 3 of the embodiment. The second circuit state corresponds to (2) above. For example, band n28 for 5G-NR is applied as band C, for example, band B20 for 4G-LTE is applied as band A and, for example, band B8 for 4G-LTE is applied as band B.

As illustrated in FIG. 6B, with the switching made by the switches, a transmission signal (n28-Tx) in band n28 for 5G-NR is output to antenna 2a through radio frequency input terminal 101, power amplifier 41, switch 31, filter 25, switch 30, diplexer 91, and switch 90. Further, a primary reception signal (n28-PRx) in band n28 for 5G-NR is output to RFIC 3 through antenna 2a, switch 90, diplexer 91, switch

30, filter 24, switch 32, low-noise amplifier 42, and radio frequency output terminal 102. Further, a primary reception signal (B20-PRx) in band B20 for 4G-LTE is output to RFIC 3 through antenna 2a, switch 90, diplexer 91, switch 30, filter 24, switch 32, low-noise amplifier 42, and radio frequency output terminal 102. Further, a diversity reception signal (B8-DRx) in band B8 for 4G-LTE is output to RFIC 3 through antenna 2a, switch 90, diplexer 91, switch 30, switch 34, filter 23, switch 33, low-noise amplifier 43, and radio frequency output terminal 103.

As illustrated in FIG. 6B, with the switching made by the switches, a transmission signal (B8-Tx) in band B8 for 4G-LTE is output to antenna 2b through radio frequency input terminal 151, power amplifier 81, switch 71, filter 61, switch 70, diplexer 92, and switch 90. Further, a primary reception signal (B8-PRx) in band B8 for 4G-LTE is output to RFIC 3 through antenna 2b, switch 90, diplexer 92, switch 70, filter 62, switch 72, low-noise amplifier 82, and radio frequency output terminal 152. Further, a diversity reception signal (B20-DRx) in band B20 for 4G-LTE is output to RFIC 3 through antenna 2b, switch 90, diplexer 92, switch 70, switch 74, filter 64, switch 73, low-noise amplifier 83, and radio frequency output terminal 153. Further, a diversity reception signal (n28-DRx) in band n28 for 5G-NR is output to RFIC 3 through antenna 2b, switch 90, diplexer 92, switch 70, switch 74, filter 64, switch 73, low-noise amplifier 83, and radio frequency output terminal 153.

Figure 6C:
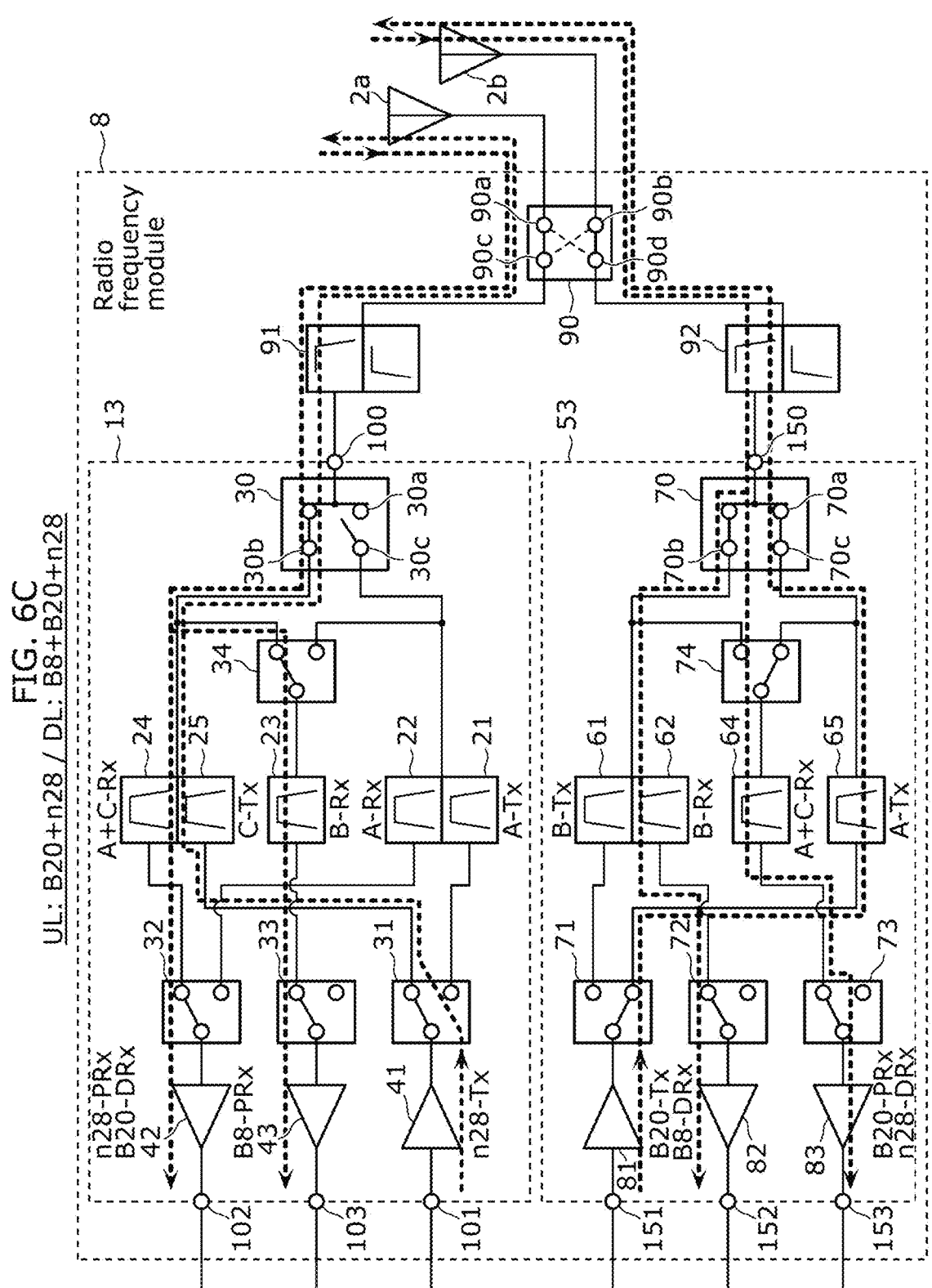
FIG. 6C illustrates a third circuit state of the radio frequency module according to Variation 3 of the embodiment.

FIG. 6C illustrates a third circuit state of radio frequency module 8 according to Variation 3 of the embodiment. The third circuit state corresponds to (3) above. For example, band n28 for 5G-NR is applied as band C, for example, band B8 for 4G-LTE is applied as band B and, for example, band B20 for 4G-LTE is applied as band A.

As illustrated in FIG. 6C, with the switching made by the switches, a transmission signal (n28-Tx) in band n28 for 5G-NR is output to antenna 2a through radio frequency input terminal 101, power amplifier 41, switch 31, filter 25, switch 30, diplexer 91, and switch 90. Further, a primary reception signal (n28-PRx) in band n28 for 5G-NR and a diversity reception signal (B20-DRx) in band B20 for 4G-LTE are output to RFIC 3 through antenna 2a, switch 90, diplexer 91, switch 30, filter 24, switch 32, low-noise amplifier 42, and radio frequency output terminal 102. Further, a primary reception signal (B8-PRx) in band B8 for 4G-LTE is output to RFIC 3 through antenna 2a, switch 90, diplexer 91, switch 30, switch 34, filter 23, switch 33, low-noise amplifier 43, and radio frequency output terminal 103.

As illustrated in FIG. 6C, with the switching made by the switches, a transmission signal (B20-Tx) in band B20 for 4G-LTE is output to antenna 2b through radio frequency input terminal 151, power amplifier 81, switch 71, filter 65, switch 70, diplexer 92, and switch 90. Further, a primary reception signal (B20-PRx) in band B20 for 4G-LTE and a diversity reception signal (n28-DRx) in band n28 for 5G-NR are output to RFIC 3 through antenna 2b, switch 90, diplexer 92, switch 70, switch 74, filter 64, switch 73, low-noise amplifier 83, and radio frequency output terminal 153. Further, a diversity reception signal (B8-DRx) in band B8 for 4G-LTE is output to RFIC 3 through antenna 2b, switch 90, diplexer 92, switch 70, filter 62, switch 72, low-noise amplifier 82, and radio frequency output terminal 152.

With the above configuration of radio frequency module 8, transmission signals in two bands out of band A, band B, and band C are transferred on different boards, and thus IMD3 generated assuming the transmission signals in the two bands are simultaneously transferred can be reduced.

Thus, spurious waves due to IMD3 can be prevented from sneaking into reception paths for band A, band B, and/or band C, and a decrease in sensitivity in receiving signals in band A, band B, and/or band C can be reduced.

1.6 Circuit Configuration of Radio Frequency Module 8A According to Variation 4

Next, a circuit configuration of radio frequency module 8A according to Variation 4 is to be described with reference to FIG. 6D.

Figure 6D:
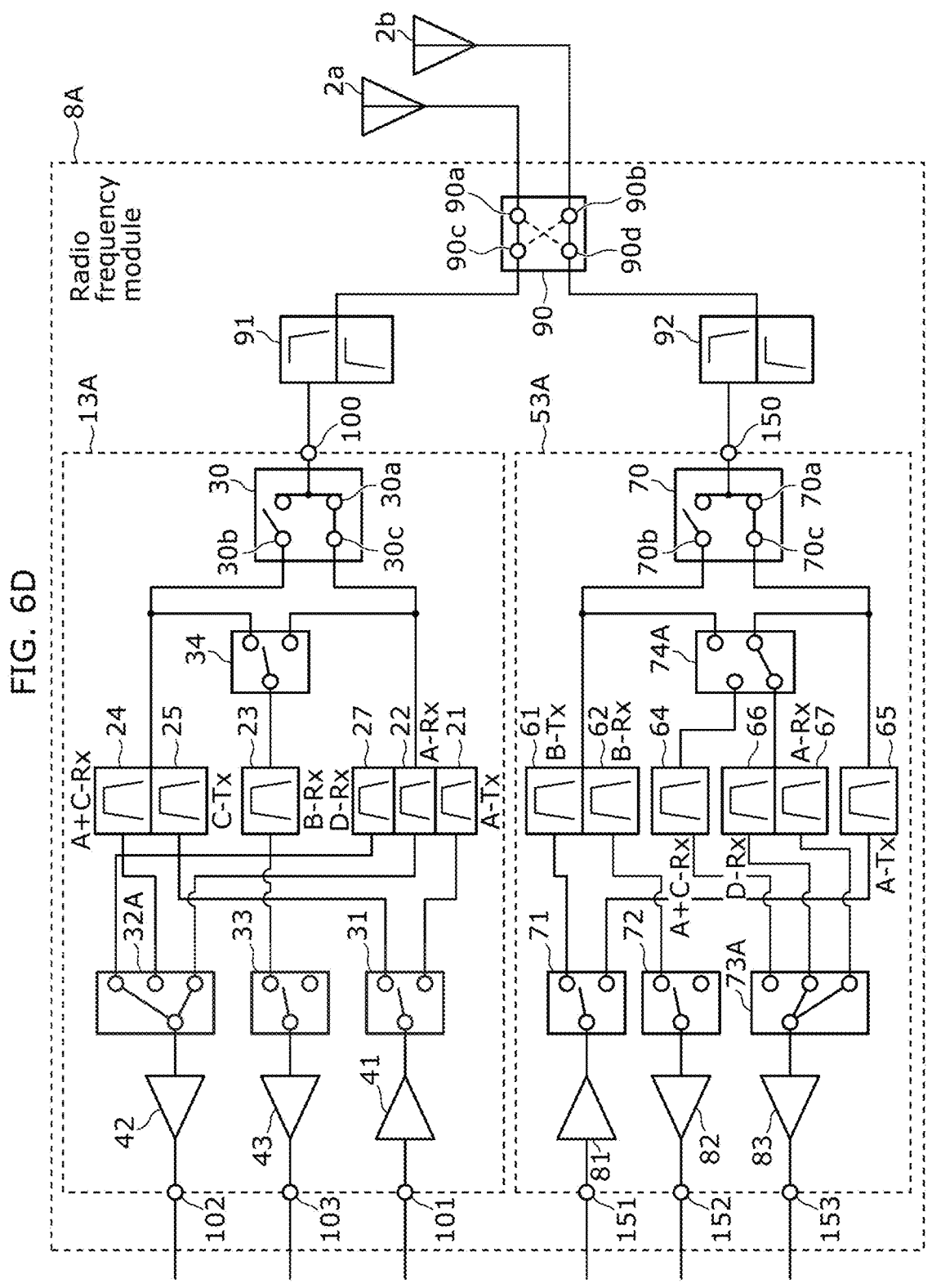
FIG. 6D illustrates a circuit configuration of a radio frequency module according to Variation 4 of the embodiment.

FIG. 6D illustrates a circuit configuration of radio frequency module 8A according to Variation 4 of the embodiment. As illustrated in FIG. 6D, radio frequency module 8A includes module boards 13A and 53A, filters 21, 22, 23, 24, 25, 27, 61, 62, 64, 65, 66, and 67, power amplifiers 41 and 81, low-noise amplifiers 42, 43, 82, and 83, switches 30, 31, 32A, 33, 34, 70, 71, 72, 73A, 74A, and 90, diplexers 91 and 92, antenna connection terminals 100 and 150, radio frequency input terminals 101 and 151, and radio frequency output terminals 102, 103, 152, and 153. Radio frequency module 8A according to this variation is different from radio frequency module 8 according to Variation 3 in that filters 27, 66, and 67 are added. The following description of radio frequency module 8A according to this variation focuses on differences from radio frequency module 8 according to Variation 3 while a description of the same points is omitted.

Module boards 13A and 53A are boards on which circuit components included in radio frequency module 8A are mounted. As module boards 13A and 53A, boards having a stacked structure of a plurality of dielectric layers are used, such an LTCC board, an HTCC board, a component-embedded board, a board that includes an RDL, and a printed circuit board, for example. Module boards 13A and 53A may be of different types of such boards. Note that module boards 13A and 53A are not included in a single continuous board, and are separate boards.

Filter 27 has a passband that includes band D. Filter 27 is connected to antenna connection terminal 100 via switch 30. Band D is a supplementary downlink (SDL) band, for example.

Filter 66 has a passband that includes band D. Filter 66 is connected to antenna connection terminal 150 via switches 74A and 70.

Filter 67 has a passband that includes the first downlink operating band in band A. Filter 67 is connected to antenna connection terminal 150 via switches 74A and 70.

Filter 64 is an example of the sixth filter, and has a passband that includes the first downlink operating band in band A and the third downlink operating band in band C. Filter 64 is connected to antenna connection terminal 150 via switches 74A and 70.

Low-noise amplifier 42 amplifies reception signals in band A, band C, and band D, which are input through antenna connection terminal 100. Low-noise amplifier 42 is connected between radio frequency output terminal 102 and switch 32A, and is connected to filters 22, 24, and 27 via switch 32A.

Low-noise amplifier 83 amplifies reception signals in band A, band C, and band D, which are input through antenna connection terminal 150. Low-noise amplifier 83 is connected between radio frequency output terminal 153 and switch 73A, and is connected to filters 64, 66, and 67 via switch 73A.

Filters 21, 22, 23, 24, 25, and 27, power amplifier 41, low-noise amplifiers 42 and 43, and antenna connection terminal 100 are disposed on module board 13A. Filters 61, 62, 64, 65, 66, and 67, power amplifier 81, low-noise amplifiers 82 and 83, and antenna connection terminal 150 are disposed on module board 53A different from module board 13A.

Switch 32A is connected between low-noise amplifier 42 and filters 22, 24, and 27, and includes a common terminal and two selection terminals. Switch 32A switches connection of low-noise amplifier 42 between filter 22, filter 24, and filter 27, based on a control signal from RFIC 3, for example.

Switch 73A is connected between low-noise amplifier 83 and filters 64, 66, and 67, and includes at least three SPST switch elements. Switch 73A switches connection of low-noise amplifier 83 between filter 64, filter 66, and filter 67, based on a control signal from RFIC 3, for example.

Switch 74A is an example of the fourth switch, is connected between an input terminal of filter 64 and switch 70, and includes two common terminals and two selection terminals. A first common terminal of switch 74A is connected to filter 64, a second common terminal of switch 74A is connected to filters 66 and 67, one selection terminal of switch 74A is connected to the second common terminal and selection terminal 70b, and the other selection terminal of switch 74A is connected to filter 65 and selection terminal 70c. Switch 74A switches connection of filter 64 between (i) filters 61 and 62 and switch 70 and (ii) filter 65 and switch 70, based on a control signal from RFIC 3, for example. Further, switch 74A switches connection of filters 66 and 67 between (i) filters 61 and 62 and switch 70 and (ii) filter 65 and switch 70, based on a control signal from RFIC 3, for example.

Switches 30, 31, 32A, 33, and 34 are disposed on module board 13A, and switches 70, 71, 72, 73A, and 74A are disposed on module board 53A. Note that switches 30, 31, 32A, 33, and 34 may not be disposed on module board 13A, and switches 70, 71, 72, 73A, and 74A may not be disposed on module board 53A.

In radio frequency module 8A according to this variation, band A is band B20 for 4G-LTE or band n20 for 5G-NR, for example, band B is band B8 for 4G-LTE or band n8 for 5G-NR, for example, and band C is band B28 for 4G-LTE or band n28 for 5G-NR, and band D is band B67 for 4G-LTE or band n67 for 5G-NR (738 MHz to 758 MHz).

With the circuit configuration as described above, radio frequency module 8A can execute at least (1) primary transmission and reception of signals in band A and diversity reception of signals in band B on module board 13A, and primary transmission and reception of signals in band B and diversity reception of signals in band A on module board 53A, (2) primary transmission and reception of signals in band C, primary reception of signals in band A, and diversity reception of signals in band B on module board 13A, and primary transmission and reception of signals in band B, diversity reception of signals in band A, and diversity reception of signals in band C on module board 53A, and (3) primary transmission and reception of signals in band C, primary reception of signals in band B, and diversity reception of signals in band A on module board 13A, and primary transmission and reception of signals in band A, diversity reception of signals in band B, and diversity reception of signals in band C on module board 53A. Furthermore, reception of signals in band D can be added to each of (1) to (3) above.

1.7 Circuit Configuration of Radio Frequency Module 8B According to Variation 5

Next, a circuit configuration of radio frequency module 8B according to Variation 5 is to be described with reference to FIG. 6E.

FIG. 6E illustrates a circuit configuration of radio frequency module 8B according to Variation 5 of the embodiment. As illustrated in FIG. 6E, radio frequency module 8B includes module boards 13B and 53B, filters 21, 22, 23, 24, 25, 27, 61, 62, 65, and 68, power amplifiers 41 and 81, low-noise amplifiers 42, 43, 82, and 83, switches 30, 31, 32A, 33, 34, 70, 71, 72, 73, 74, and 90, diplexers 91 and 92, antenna connection terminals 100 and 150, radio frequency input terminals 101 and 151, and radio frequency output terminals 102, 103, 152, and 153. Radio frequency module 8B according to this variation is different from radio frequency module 8A according to Variation 4 in that one filter 68 is disposed instead of three filters 64, 66, and 67. The following description of radio frequency module 8B according to this variation focuses on differences from radio frequency module 8A according to Variation 4 while a description of the same points is omitted.

Module boards 13B and 53B are boards on which circuit components included in radio frequency module 8B are mounted. As module boards 13B and 53B, boards having a stacked structure of a plurality of dielectric layers are used, such an LTCC board, an HTCC board, a component-embedded board, a board that includes an RDL, and a printed circuit board, for example. Module boards 13B and 53B may be of different types of such boards. Note that module boards 13B and 53B are not included in a single continuous board, and are separate boards.

Filter 68 has a passband that includes the first downlink operating band in band A, the third downlink operating band in band C, and band D. Filter 68 is connected to antenna connection terminal 150 via switches 74 and 70.

Low-noise amplifier 83 amplifies reception signals in band A, band C, and band D, which are input through antenna connection terminal 150. Low-noise amplifier 83 is connected between radio frequency output terminal 153 and switch 73, and is connected to filter 68 via switch 73.

Filters 21, 22, 23, 24, 25, and 27, power amplifier 41, low-noise amplifiers 42 and 43, and antenna connection terminal 100 are disposed on module board 13B. Filters 61, 62, 65, and 68, power amplifier 81, low-noise amplifiers 82 and 83, and antenna connection terminal 150 are disposed on module board 53B different from module board 13B.

Switch 73 is connected between filter 68 and low-noise amplifier 83, and includes at least one SPST switch element. Switch 73 switches between connection and disconnection of filter 68 to/from low-noise amplifier 83, based on a control signal from RFIC 3, for example.

Switch 74 is an example of the fourth switch, is connected between an input terminal of filter 68 and switch 70, and includes a common terminal and two selection terminals. The common terminal of switch 74 is connected to filter 68, one selection terminal of switch 74 is connected to the second common terminal and selection terminal 70b, and the other selection terminal of switch 74 is connected to filter 65 and selection terminal 70c. Switch 74 switches connection of filter 68 between (i) filters 61 and 62 and switch 70 and (ii) filter 65 and switch 70, based on a control signal from RFIC 3, for example.

Switches 30, 31, 32A, 33, and 34 are disposed on module board 13B, and switches 70, 71, 72, 73, and 74 are disposed on module board 53B. Note that switches 30, 31, 32A, 33, and 34 may not be disposed on module board 13B, and switches 70 to 74 may not be disposed on module board 53B.

In radio frequency module 8B according to this variation, band A is, for example, band B20 for 4G-LTE or band n20 for 5G-NR, band B is, for example, band B8 for 4G-LTE or band n8 for 5G-NR, and band C is, for example, band B28 for 4G-LTE or band n28 for 5G-NR, and band D, for example, is band B67 for 4G-LTE or band n67 for 5G-NR.

With the circuit configuration as described above, radio frequency module 8B can execute at least (1) primary transmission and reception of signals in band A and diversity reception of signals in band B on module board 13B, and primary transmission and reception of signals in band B and diversity reception of signals in band A on module board 53B, (2) primary transmission and reception of signals in band C, primary reception of signals in band A, and diversity reception of signals in band B on module board 13B, and primary transmission and reception of signals in band B, diversity reception of signals in band A, and diversity reception of signals in band C on module board 53B, and (3) primary transmission and reception of signals in band C, primary reception of signals in band B, and diversity reception of signals in band A on module board 13B, and primary transmission and reception of signals in band A, diversity reception of signals in band B, and diversity reception of signals in band C on module board 53B. Furthermore, reception of signals in band D can be added to each of (1) to (3) above.

1.8 Circuit Configuration of Radio Frequency Module 9 According to Variation 6

Next, a circuit configuration of radio frequency module 9 according to Variation 6 is to be described with reference to FIG. 7.

Figure 7:
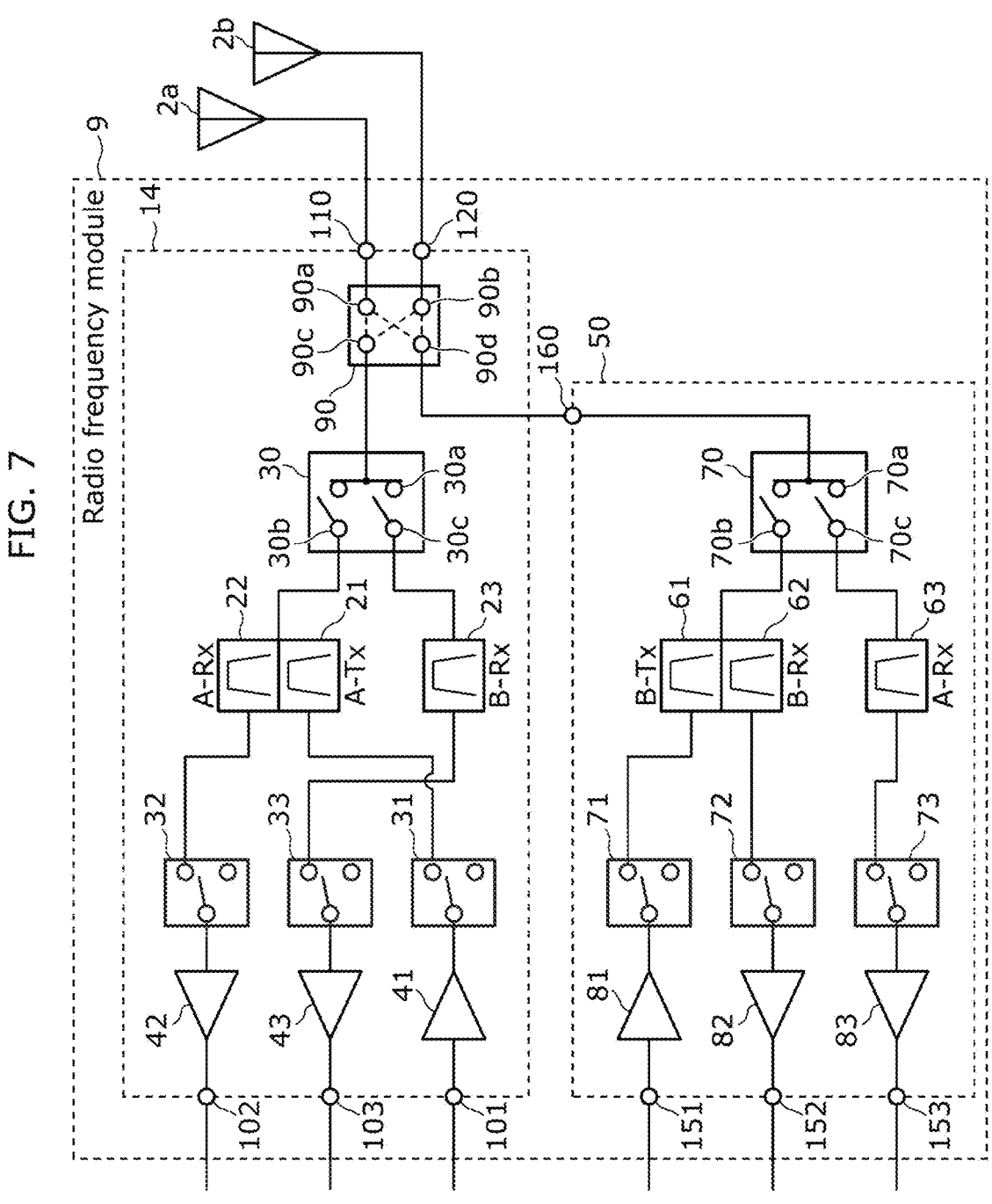
FIG. 7 illustrates a circuit configuration of a radio frequency module according to Variation 6 of the embodiment.

FIG. 7 illustrates a circuit configuration of radio frequency module 9 according to Variation 6 of the embodiment. As illustrated in FIG. 7, radio frequency module 9 includes module boards 14 and 50, filters 21, 22, 23, 61, 62, and 63, power amplifiers 41 and 81, low-noise amplifiers 42, 43, 82, and 83, switches 30, 31, 32, 33, 70, 71, 72, 73, and 90, antenna connection terminals 110 and 120, switch connection terminal 160, radio frequency input terminals 101 and 151, and radio frequency output terminals 102, 103, 152, and 153. Radio frequency module 9 according to this variation is different from radio frequency module 1 according to the embodiment in that switch 90 is added and in the arrangement of the connection terminals. The following description of radio frequency module 9 according to this variation focuses on differences from radio frequency module 1 according to the embodiment while a description of the same points is omitted.

Module boards 14 and 50 are boards on which circuit components included in radio frequency module 9 are mounted. As module boards 14 and 50, boards having a stacked structure of a plurality of dielectric layers are used, such an LTCC board, an HTCC board, a component-embedded board, a board that includes an RDL, and a printed circuit board, for example. Module boards 14 and 50 may be of different types of such boards. Note that module boards 14 and 50 are not included in a single continuous board, and are separate boards.

Antenna connection terminal 110 is an example of a third antenna terminal, is disposed on module board 14, and is connected to antenna 2a. Antenna connection terminal 120 is an example of a fourth antenna terminal, is disposed on module board 14, and is connected to antenna 2b.

Switch connection terminal 160 is disposed on module board 50 different from module board 14. Switch connection terminal 160 is connected, via switch 70, to the output terminal of filter 61, the input terminal of filter 62, and the input terminal of filter 63. Further, switch connection terminal 160 is connected to terminal 90*d* of switch 90.

Switch 90 is an example of a fifth switch, is disposed on module board 14, and includes terminal 90*a* (a first terminal), terminal 90*b* (a second terminal), terminal 90*c* (a third terminal), and terminal 90*d* (a fourth terminal). Terminal 90*a* is connected to antenna 2*a* via antenna connection terminal 110, and terminal 90*b* is connected to antenna 2*b* via antenna connection terminal 120. Terminal 90*c* is connected, via switch 30, to the output terminal of filter 21, the input terminal of filter 22, and the input terminal of filter 23, and terminal 90*d* is connected to switch connection terminal 160. Switch 90 mutually exclusively selects conduction between terminals 90*a* and 90*c* or conduction between terminals 90*a* and 90*d*, and mutually exclusively selects conduction between terminals 90*b* and 90*c* or conduction between terminals 90*b* and 90*d*. Switch 90 is a DPDT switch circuit that includes terminals 90*a* to 90*d*, for example. Since switch 90 is disposed, connection of switches 30 and 70 to antennas 2*a* and 2*b* can be switched according to a combination of bands for transferring signals.

With the above configuration, a transmission path for band A and a transmission path for band B are provided on different boards, and thus IMD3 generated assuming signals in band A and band B are simultaneously transmitted can be reduced. Thus, spurious waves due to IMD3 can be prevented from sneaking into reception paths for band A and/or band B, and a decrease in sensitivity in receiving signals in band A and/or band B can be reduced. Further, antenna connection terminals 110 and 120 are not disposed on module board 50, but on module board 14, and thus a connection configuration of antennas 2*a* and 2*b* being connected to radio frequency module 9 can be simplified.

Note that radio frequency module 9 may not include switch 90. In this case, antenna connection terminal 110 is connected to common terminal 30*a*, and antenna connection terminal 120 is connected to common terminal 70*a* via switch connection terminal 160.

2 Advantageous Effects and Others

As described above, radio frequency module 1 according to the exemplary embodiment is configured to simultaneously transmit a signal in band A and a signal in band B. Band A includes a first uplink operating band and a first downlink operating band, band B includes a second uplink operating band and a second downlink operating band, and the first downlink operating band, the first uplink operating band, the second uplink operating band, and the second downlink operating band are listed in ascending or descending order of frequency. Radio frequency module 1 includes: module boards 10 and 50; filter 21 disposed on module board 10 and having a passband that includes the first uplink operating band; filter 22 disposed on module board 10 and having a passband that includes the first downlink operating band; filter 23 disposed on module board and having a passband that includes the second downlink operating band; power amplifier 41 disposed on module board 10 and connected to filter 21; filter 61 disposed on module board 50 different from module board 10 and having a passband that includes the second uplink operating band; filter 62 disposed on module board 50 and having a passband that includes the second downlink operating band; filter 63 disposed on module board 50 and having a passband that includes the first downlink operating band; and power amplifier 81 disposed on module board 50 and connected to filter 61.

According to this, a transmission path for band A (power amplifier 41+filter 21) and a transmission path for band B (power amplifier 81+filter 61) are provided on different boards, and thus IMD3 generated assuming a signal in band A and a signal in band B are simultaneously transmitted can be decreased. Thus, spurious waves due to IMD3 can be prevented from sneaking into reception paths for band A (filter 22+low-noise amplifier 42 and filter 63+low-noise amplifier 83) and reception paths for band B (filter 23+low-noise amplifier 43 and filter 62+low-noise amplifier 82), and a decrease in reception sensitivity for band A and/or band B can be reduced.

Assuming primary transmission and reception of signals in band A and diversity reception of signals in band B, and primary transmission and reception of signals in band B and diversity reception of signals in band A are executed, in module board 10, filters 21 to 23 should be simultaneously connected, but the passband of filter 23 (the second downlink operating band) is higher or lower in frequency than band A. Accordingly, impedance in the second downlink operating band for band B can be more readily adjusted to be open than band A. Thus, deterioration in characteristics of filters 21 to 23 assuming filters 21 to 23 are simultaneously connected can be reduced. On module board 50, filters 61 to 63 should be simultaneously connected, but the passband of filter 63 (the first downlink operating band) is lower or higher in frequency than band B. Accordingly, impedance in the first downlink operating band can be more readily adjusted to be open than band B. Thus, deterioration in characteristics of filters 61 to 63 assuming filters 61 to 63 are simultaneously connected can be reduced.

For example, in radio frequency module 1, filter 21 and filter 22 may be included in a duplexer having a passband that is band A, and including a first common terminal, and filter 61 and filter 62 may be included in a duplexer having a passband that is band B, and including a second common terminal. Radio frequency module 1 may further include: antenna connection terminal 100 disposed on module board 10; switch 30 disposed on module board 10, configured to switch between connection of antenna connection terminal 100 to the first common terminal and disconnection of antenna connection terminal 100 from the first common terminal, and configured to switch between connection of antenna connection terminal 100 to filter 23 and disconnection of antenna connection terminal 100 from filter 23; antenna connection terminal 150 disposed on module board 50; and switch 70 disposed on module board 50, configured to switch between connection of antenna connection terminal 150 to the second common terminal and disconnection of antenna connection terminal 150 from the second common terminal, and configured to switch between connection of antenna connection terminal 150 to filter 63 and disconnection of antenna connection terminal 150 from filter 63.

According to this, (1) primary transmission and reception of signals in band A on module board 10 and diversity reception of signals in band A on module board 50 can be executed highly isolated from transmission and reception paths for band B. Further, (2) primary transmission and reception of signals in band B on module board 50 and diversity reception of signals in band B on module board 10 can be executed highly isolated from transmission and reception paths for band A.

For example, in radio frequency module 6 according to Variation 1, an output terminal of filter 21, an input terminal of filter 22, and an input terminal of filter 23 may be directly connected to one another, and an output terminal of filter 61, an input terminal of filter 62, and an input terminal of filter 63 may be directly connected to one another.

According to this, module board 11 needs no switch to switch between connection and disconnection of filters 21 to 23 to/from antenna 2a, and module board 51 needs no switch to switch between connection and disconnection of filters 61 to 63 to/from antenna 2b. Thus, the size of radio frequency module 6 can be reduced.

For example, in radio frequency module 7 according to Variation 2, the first downlink operating band may at least partially overlap a third downlink operating band included in band C, the passband of filter 24 may include the first downlink operating band and the third downlink operating band, and the passband of filter 64 may include the first downlink operating band and the third downlink operating band.

According to this, filters 24 and 64 also serve as a filter for the first downlink operating band and a filter for the third downlink operating band, respectively, and thus small radio frequency module 7 that can perform multiband transfer for signals in band A, band B, and band C can be produced.

For example, in radio frequency module 8 according to Variation 3, the first downlink operating band may at least partially overlap a third downlink operating band included in band C, and the passband of filter 64 may include the first downlink operating band and the third downlink operating band. Radio frequency module 8 may further include: filter 25 disposed on module board 13 and having a passband that includes a third uplink operating band included in band C; filter 24 disposed on module board 13 and having a passband that includes the third downlink operating band; filter 65 disposed on module board 53 and having a passband that includes the first uplink operating band; switch 34 connected to an input terminal of filter 23, and configured to switch connection of the input terminal of filter 23 between an input terminal of filter 22 and an input terminal of filter 24; and switch 74 connected to an input terminal of filter 64, and configured to switch connection of the input terminal of filter 64 between an input terminal of filter 62 and an output terminal of filter 65.

According to this, transmission signals in two bands out of band A, band B, and band C are transferred on different boards, and thus IMD3 generated assuming the transmission signals in the two bands are simultaneously transferred can be reduced. Thus, spurious waves due to IMD3 can be prevented from sneaking into reception paths for band A, band B, and/or band C, and a decrease in sensitivity in receiving signals in band A, band B, and/or band C can be reduced.

For example, radio frequency module 9 according to Variation 6 may further include: antenna connection terminals 110 and 120 disposed on module board 14; switch connection terminal 160 disposed on module board 50, and connected to an output terminal of filter 61, an input terminal of filter 62, and an input terminal of filter 63; and switch 90 that includes terminal 90a, terminal 90b, terminal 90c, and terminal 90d. Terminal 90a may be connected to antenna connection terminal 110, terminal 90b may be connected to antenna connection terminal 120, terminal 90c may be connected to an output terminal of filter 21, an input terminal of filter 22, and an input terminal of filter 23, and terminal 90d may be connected to switch connection terminal 160.

According to this, since a transmission path for band A and a transmission path for band B are provided on different boards, and thus IMD3 generated assuming signals in band A and band B are simultaneously transmitted can be reduced. Thus, spurious waves due to IMD3 can be prevented from sneaking into a reception path for band A and/or a reception path for band B, and a decrease in sensitivity in receiving signals in band A and/or band B can be reduced. Further, antenna connection terminals 110 and 120 are not disposed on module board 50, but on module board 14, and thus a connection configuration of antennas 2a and 2b being connected to radio frequency module 9 can be simplified.

For example, in radio frequency modules 1 and 6 to 9, band A and band B may belong to a low band group from 700 MHz to 1 GHz inclusive.

For example, in radio frequency modules 7 and 8, band C may be band B28 for Fourth-Generation Long-Term Evolution (4G LTE) or band n28 for Fifth-Generation New Radio (5G NR).

For example, in radio frequency modules 1 and 6 to 9, band A may be for Fourth-Generation Long-Term Evolution (4G LTE), and band B may be for Fifth-Generation New Radio (5G NR).

According to this, EN-DC is possible.

For example, in radio frequency modules 1 and 6 to 9, band A may be band B20 for 4G LTE, and band B may be band n8 for 5G NR.

For example, in radio frequency modules 1 and 6 to 9, band A may be band B5 for 4G LTE, and band B may be band n13 for 5G NR.

For example, in radio frequency modules 1 and 6 to 9, band A may be for Fifth-Generation New Radio (5G NR), and band B may be for Fourth-Generation Long-Term Evolution (4G LTE).

According to this, EN-DC is possible.

For example, in radio frequency modules 1 and 6 to 9, band A may be band n20 for 5G NR, and band B may be band B8 for 4G LTE.

For example, in radio frequency modules 1 and 6 to 9, band A may be band n5 for 5G NR, and band B may be band B13 for 4G LTE.

For example, radio frequency module 6 according to Variation 1 is configured to transmit a signal in band A and a signal in band B. Band A includes a first uplink operating band and a first downlink operating band. Band B includes a second uplink operating band and a second downlink operating band. The first downlink operating band is lower or higher in frequency than both the first uplink operating band and the second uplink operating band. The second downlink operating band is lower or higher in frequency than both the first uplink operating band and the second uplink operating band. Radio frequency module 6 includes: module boards 11 and 51; filter 21 disposed on module board 11 and having a passband that includes the first uplink operating band; filter 22 disposed on module board 11 and having a passband that includes the first downlink operating band; filter 23 disposed on module board 11 and having a passband that includes the second downlink operating band; power amplifier 41 disposed on module board 11 and connected to filter 21; filter 61 disposed on module board 51 different from module board 11 and having a passband that includes the second uplink operating band; filter 62 disposed on module board 51 and having a passband that includes the second downlink operating band; filter 63 disposed on module board 51 and having a passband that includes the first downlink operating band; and power amplifier 81 disposed on module board 51 and connected to filter 61.

For example, in radio frequency module 6, band A may be band B13 for Fourth-Generation Long-Term Evolution (4G LTE) or band n13 for Fifth-Generation New Radio (5G NR), and band B may be band B14 for 4G LTE or band n14 for 5G NR.

Communication device 5 according to the exemplary embodiment includes: RFIC 3 configured to process a radio frequency signal; and radio frequency module 1 configured to transfer the radio frequency signal between RFIC 3 and antennas 2a and 2b.

According to this, advantageous effects yielded by radio frequency module 1 can be yielded by communication device 5.

Other Exemplary Embodiments

The above has described the radio frequency modules and the communication device according to the present disclosure based on the embodiment and the variations, yet the radio frequency modules and the communication device according to the present disclosure are not limited to the above embodiment and the above variations. The present disclosure also encompasses other exemplary embodiments resulting from combining arbitrary elements in the embodiment and the variations, variations resulting from applying, to the embodiment and the variations, various modifications that may be conceived by those skilled in the art within a range that does not depart from the scope of the present disclosure, and various devices that each include a radio frequency module as above and the communication device.

For example, in circuit configurations of the radio frequency modules and the communication device according to the embodiment and the variations, another circuit element and another line, for instance, may be disposed between circuit elements and paths connecting signal paths, which are illustrated in the drawings.

In the above embodiment, 5G-NR and 4G-LTE bands are used, yet a communication band for other wireless access technology may be used in addition to or instead of 5G-NR and/or 4G-LTE. For example, a communication band for a wireless local area network may be used. For example, an extremely high frequency band of 7 GHz or higher may be used. In this case, radio frequency module 1, antennas 2a and 2b, and RFIC 3 may be included in an extremely high frequency antenna module, and distributed constant filters, for example, may be used as the filters.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure can be widely used in communication apparatuses such as mobile phones, as a radio frequency module disposed in a front-end portion.

The invention claimed is:

1. A radio frequency module configured to simultaneously transmit a signal in a first band and a signal in a second band, the first band including a first uplink operating band and a first downlink operating band, the second band including a second uplink operating band and a second downlink operating band, the first downlink operating band, the first uplink operating band, the second uplink operating band, and the second downlink operating band being listed in ascending or descending order of frequency,

the radio frequency module comprising:
a first board;
a second board different from the first board;
a first filter disposed on the first board and having a passband that includes the first uplink operating band;
a second filter disposed on the first board and having a passband that includes the first downlink operating band;
a third filter disposed on the first board and having a passband that includes the second downlink operating band;
a first power amplifier disposed on the first board and connected to the first filter;
a fourth filter disposed on the second board and having a passband that includes the second uplink operating band;
a fifth filter disposed on the second board and having a passband that includes the second downlink operating band;
a sixth filter disposed on the second board and having a passband that includes the first downlink operating band; and
a second power amplifier disposed on the second board and connected to the fourth filter.

2. The radio frequency module according to claim 1, wherein the first filter and the second filter are included in a duplexer having a passband that is the first band, and including a first common terminal,
the fourth filter and the fifth filter are included in a duplexer having a passband that is the second band, and including a second common terminal, and
the radio frequency module further includes:
a first antenna connection terminal disposed on the first board;
a first switch disposed on the first board, configured to switch between connection of the first antenna connection terminal to the first common terminal and disconnection of the first antenna connection terminal from the first common terminal, and configured to switch between connection of the first antenna connection terminal to the third filter and disconnection of the first antenna connection terminal from the third filter;
a second antenna connection terminal disposed on the second board; and
a second switch disposed on the second board, configured to switch between connection of the second antenna connection terminal to the second common terminal and disconnection of the second antenna connection terminal from the second common terminal, and configured to switch between connection of the second antenna connection terminal to the sixth filter and disconnection of the second antenna connection terminal from the sixth filter.

3. The radio frequency module according to claim 1, wherein an output terminal of the first filter, an input terminal of the second filter, and an input terminal of the third filter are directly connected to one another, and an output terminal of the fourth filter, an input terminal of the fifth filter, and an input terminal of the sixth filter are directly connected to one another.

4. The radio frequency module according to claim 1, wherein the first downlink operating band at least partially overlaps a third downlink operating band included in a third band, the passband of the second filter includes the first down-link operating band and the third downlink operating band, and the passband of the sixth filter includes the first downlink operating band and the third downlink operating band.

5. The radio frequency module according to claim 1, wherein the first downlink operating band at least partially overlaps a third downlink operating band included in a third band, the passband of the sixth filter includes the first downlink operating band and the third downlink operating band, and the radio frequency module further includes:

a seventh filter disposed on the first board and having a passband that includes a third uplink operating band included in the third band;

an eighth filter disposed on the first board and having a passband that includes the third downlink operating band;

a ninth filter disposed on the second board and having a passband that includes the first uplink operating band;

a third switch connected to an input terminal of the third filter, and configured to switch connection of the input terminal of the third filter between an input terminal of the second filter and an input terminal of the eighth filter; and a fourth switch connected to an input terminal of the sixth filter, and configured to switch connection of the input terminal of the sixth filter between an input terminal of the fifth filter and an output terminal of the ninth filter.

6. The radio frequency module according to claim 1, further comprising:

a third antenna connection terminal disposed on the first board;

a fourth antenna connection terminal disposed on the first board;

a switch connection terminal disposed on the second board, and connected to an output terminal of the fourth filter, an input terminal of the fifth filter, and an input terminal of the sixth filter; and a fifth switch that includes a first terminal, a second terminal, a third terminal, and a fourth terminal, wherein the first terminal is connected to the third antenna connection terminal, the second terminal is connected to the fourth antenna connection terminal, the third terminal is connected to an output terminal of the first filter, an input terminal of the second filter, and an input terminal of the third filter, and the fourth terminal is connected to the switch connection terminal.

7. The radio frequency module according to claim 1, wherein the first band and the second band belong to a low band group from 700 MHz to 1 GHz inclusive.

8. The radio frequency module according to claim 4, wherein the third band is band B28 for Fourth-Generation Long-Term Evolution (4G LTE) or band n28 for Fifth-Generation New Radio (5G NR).

9. The radio frequency module according to claim 1, wherein the first band is for Fourth-Generation Long-Term Evolution (4G LTE), and the second band is for Fifth-Generation New Radio (5G NR).

10. The radio frequency module according to claim 9, wherein the first band is band B20 for 4G LTE, and the second band is band n8 for 5G NR.

11. The radio frequency module according to claim 9, wherein the first band is band B5 for 4G LTE, and the second band is band n13 for 5G NR.

12. The radio frequency module according to claim 1, wherein the first band is for Fifth-Generation New Radio (5G NR), and the second band is for Fourth-Generation Long-Term Evolution (4G LTE).

13. The radio frequency module according to claim 12, wherein the first band is band n20 for 5G NR, and the second band is band B8 for 4G LTE.

14. The radio frequency module according to claim 12, wherein the first band is band n5 for 5G NR, and the second band is band B13 for 4G LTE.

15. A communication device comprising:

a signal processing circuit configured to process a radio frequency signal; and the radio frequency module according to claim 1 configured to transfer the radio frequency signal between the signal processing circuit and an antenna.

16. The radio frequency module according to claim 1, wherein the first downlink operating band at least partially overlaps a third downlink operating band included in a third band, and the passband of the sixth filter includes the first downlink operating band and the third downlink operating band.

17. The radio frequency module according to claim 16, wherein the first band and the second band belong to a low band group from 700 MHz to 1 GHz inclusive.

18. The radio frequency module according to claim 17, further comprising:

a third antenna connection terminal disposed on the first board;

a fourth antenna connection terminal disposed on the first board;

a switch connection terminal disposed on the second board, and connected to an output terminal of the fourth filter, an input terminal of the fifth filter, and an input terminal of the sixth filter; and a fifth switch that includes a first terminal, a second terminal, a third terminal, and a fourth terminal, wherein the first terminal is connected to the third antenna connection terminal, the second terminal is connected to the fourth antenna connection terminal, the third terminal is connected to an output terminal of the first filter, an input terminal of the second filter, and an input terminal of the third filter, and the fourth terminal is connected to the switch connection terminal.

19. A radio frequency module configured to transmit a signal in a first band and a signal in a second band, the first band including a first uplink operating band and a first downlink operating band, the second band including a second uplink operating band and a second downlink operating band, the first downlink operating band being lower or higher in frequency than both the first uplink operating band and the second uplink operating band, the second downlink operating band being lower or higher in frequency than both the first uplink operating band and the second uplink operating band, the radio frequency module comprising:
a first board;
a second board different from the first board;
a first filter disposed on the first board and having a
passband that includes the first uplink operating
band;
a second filter disposed on the first board and having a
passband that includes the first downlink operating
band;
a third filter disposed on the first board and having a
passband that includes the second downlink operat-
ing band;
a first power amplifier disposed on the first board and
connected to the first filter;
a fourth filter disposed on the second board and having
a passband that includes the second uplink operating
band;
a fifth filter disposed on the second board and having a
passband that includes the second downlink operat-
ing band;
a sixth filter disposed on the second board and having
a passband that includes the first downlink operating
band; and
a second power amplifier disposed on the second board
and connected to the fourth filter.
20. The radio frequency module according to claim 19,
wherein the first band is band B13 for Fourth-Generation
Long-Term Evolution (4G LTE) or band n13 for Fifth-
Generation New Radio (5G NR), and
the second band is band B14 for 4G LTE or band n14 for
5G NR.

* * * * *